(12) United States Patent
Yamaoka et al.

(10) Patent No.: US 9,497,571 B2
(45) Date of Patent: Nov. 15, 2016

(54) COMMUNICATION APPARATUS, COMMUNICATION SYSTEM, PORTABLE TERMINAL, COMPUTER-READABLE RECORDING MEDIUM, AND SERVER

(71) Applicant: Panasonic Intellectual Property Corporation of America, Torrance, CA (US)

(72) Inventors: Masaru Yamaoka, Osaka (JP); Michihiro Matsumoto, Shiga (JP); Mahbub Rashid, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 210 days.

(21) Appl. No.: 14/364,142

(22) PCT Filed: Oct. 3, 2013

(86) PCT No.: PCT/JP2013/005911
§ 371 (c)(1),
(2) Date: Jun. 10, 2014

(87) PCT Pub. No.: WO2014/057634
PCT Pub. Date: Apr. 17, 2014

(65) Prior Publication Data
US 2014/0323053 A1    Oct. 30, 2014

(30) Foreign Application Priority Data
Oct. 10, 2012   (JP) ................................ 2012-225225

(51) Int. Cl.
*H04W 4/00*   (2009.01)
*H04W 52/02*  (2009.01)
(Continued)

(52) U.S. Cl.
CPC ........... *H04W 4/008* (2013.01); *H04M 1/7253* (2013.01); *H04W 52/0229* (2013.01);
(Continued)

(58) Field of Classification Search
USPC ................................................. 455/41.2, 41.1
See application file for complete search history.

(56) References Cited

U.S. PATENT DOCUMENTS 6,968,153 B1 * 11/2005 Heinonen ............. H04W 88/04
                                                            370/338
7,555,296 B2 * 6/2009 Ishidoshiro ........... H04W 84/12
                                                            455/41.1
(Continued)

FOREIGN PATENT DOCUMENTS

| JP | 2006-195627 | 7/2006 |
| JP | 2008-271150 | 11/2008 |

(Continued)

OTHER PUBLICATIONS

International Search Report issued Dec. 24, 2013 in International (PCT) Application No. PCT/JP2013/005911.

*Primary Examiner* — Nay A Maung
*Assistant Examiner* — Erica Fleming-Hall
(74) *Attorney, Agent, or Firm* — Wenderoth, Lind & Ponack, L.L.P.

(57) ABSTRACT

A proximity wireless power supply unit (123) is activated by radio waves of proximity wireless communication transmitted from a portable terminal (200). A proximity wireless memory (121) is driven by power supplied from the proximity wireless power supply unit (123), and stores an operation command of a communication apparatus (100). A control unit (111) is driven by power supplied from a main power supply unit (112), and reads out the operation command from the proximity wireless memory (121) to execute the operation command. The main power supply unit (112)
(Continued)

is activated on the basis of a signal received by a proximity wireless communication unit (122), and supplies power to the control unit (111). The proximity wireless communication unit (122) receives the operation command transmitted from the portable terminal (200), and writes the operation command in the proximity wireless memory (121).

10 Claims, 20 Drawing Sheets

(51) Int. Cl.
*H04M 1/725* (2006.01)
*H04W 84/12* (2009.01)

(52) U.S. Cl.
CPC ..... *H04W 52/0296* (2013.01); *H04M 2250/04* (2013.01); *H04W 84/12* (2013.01)

(56) References Cited

U.S. PATENT DOCUMENTS

| | | | |
|---|---|---|---|
| 2001/0002912 A1* | 6/2001 | Tony | H04L 29/06 370/487 |
| 2004/0176032 A1* | 9/2004 | Kotola | G06K 7/0008 455/41.2 |
| 2004/0214524 A1* | 10/2004 | Noda | H04W 4/00 455/41.2 |
| 2004/0242250 A1* | 12/2004 | Sasai | H04W 56/002 455/502 |
| 2007/0037608 A1* | 2/2007 | Van Dievoet | H04W 88/02 455/573 |
| 2009/0253374 A1* | 10/2009 | Matsuo | H04W 76/028 455/41.2 |
| 2011/0007901 A1* | 1/2011 | Ikeda | H04B 5/02 380/270 |
| 2011/0234013 A1* | 9/2011 | Hatakeyama | H04B 5/0037 307/104 |
| 2012/0108181 A1 | 5/2012 | Matsuo et al. | |
| 2012/0202420 A1* | 8/2012 | Horiguchi | H04L 1/0041 455/39 |
| 2012/0270498 A1* | 10/2012 | Kurz | H04W 76/023 455/41.1 |
| 2012/0309318 A1 | 12/2012 | Matsuo et al. | |
| 2013/0225083 A1* | 8/2013 | Matsuo | H04W 76/028 455/41.2 |
| 2013/0247117 A1* | 9/2013 | Yamada | G08C 17/02 725/93 |
| 2015/0003823 A1* | 1/2015 | Kawanishi | H04B 10/07 398/17 |

FOREIGN PATENT DOCUMENTS

| | | |
|---|---|---|
| JP | 2008-283590 | 11/2008 |
| JP | 2009-124409 | 6/2009 |
| JP | 2010-50905 | 3/2010 |
| JP | 2011-87249 | 4/2011 |
| JP | 2011-100280 | 5/2011 |

* cited by examiner

COMMUNICATION APPARATUS, COMMUNICATION SYSTEM, PORTABLE TERMINAL, COMPUTER-READABLE RECORDING MEDIUM, AND SERVER

TECHNICAL FIELD

The present invention relates to a technology in which a portable terminal and a communication apparatus perform communication by using proximity wireless communication.

BACKGROUND ART

Recently, in order to simplify the setting work of setting data required when communication apparatuses are connected to each other by a wireless LAN, there is proposed a communication apparatus that acquires setting data from other communication apparatus by proximity wireless communication, and is wirelessly connected with the other communication apparatus by a wireless LAN by using the acquired setting data (e.g., Patent Document 1).

Patent Document 1 discloses the following technology, the purpose of which is to prevent the imposing of operation (touch) of holding the communication apparatus up over the other communication apparatus, on a user, each time the communication apparatus is wirelessly connected. That is, in a case where the setting data is stored in a storage unit before the wireless connection to the other communication apparatus is disconnected, and wireless connection to the other communication apparatus is performed again, the wireless connection to other wireless apparatus is performed by using the setting data stored in the storage unit.

However, in Patent Document 1, the setting data by the wireless LAN is merely written in the storage unit, and data other than the setting data is not written in the storage unit. Therefore, there is a problem that a user cannot be provided with various services by linking the communication apparatuses with each other in accordance with the data written in the storage unit.

Patent Document 1: Japanese Patent Application Laid-open No. 2008-271150

SUMMARY OF THE INVENTION

An object of the present invention is to provide a technology capable of linking a portable terminal and a communication apparatus simply by holding the portable terminal up over the communication apparatus a small number of times, and providing a user with various services.

A communication apparatus according to an aspect of the present invention is a communication apparatus configured to be communicable with a portable terminal, and includes: a proximity wireless power supply unit that is activated by radio waves of proximity wireless communication transmitted from the portable terminal; a non-volatile memory that is driven by power supplied from the proximity wireless power supply unit, and stores an operation command of the communication apparatus; a proximity wireless communication unit that is driven by the power supplied from the proximity wireless power supply unit, and performs proximity wireless communication with the portable terminal; a main power supply unit that is activated on the basis of a signal received by the proximity wireless communication unit; and a control unit that is driven by power supplied from the main power supply unit, and reads out the operation command from the non-volatile memory to execute the operation command, wherein the proximity wireless communication unit writes the operation command transmitted from the portable terminal, in the non-volatile memory.

DESCRIPTION OF EMBODIMENTS (Embodiment 1)

Figure 1:
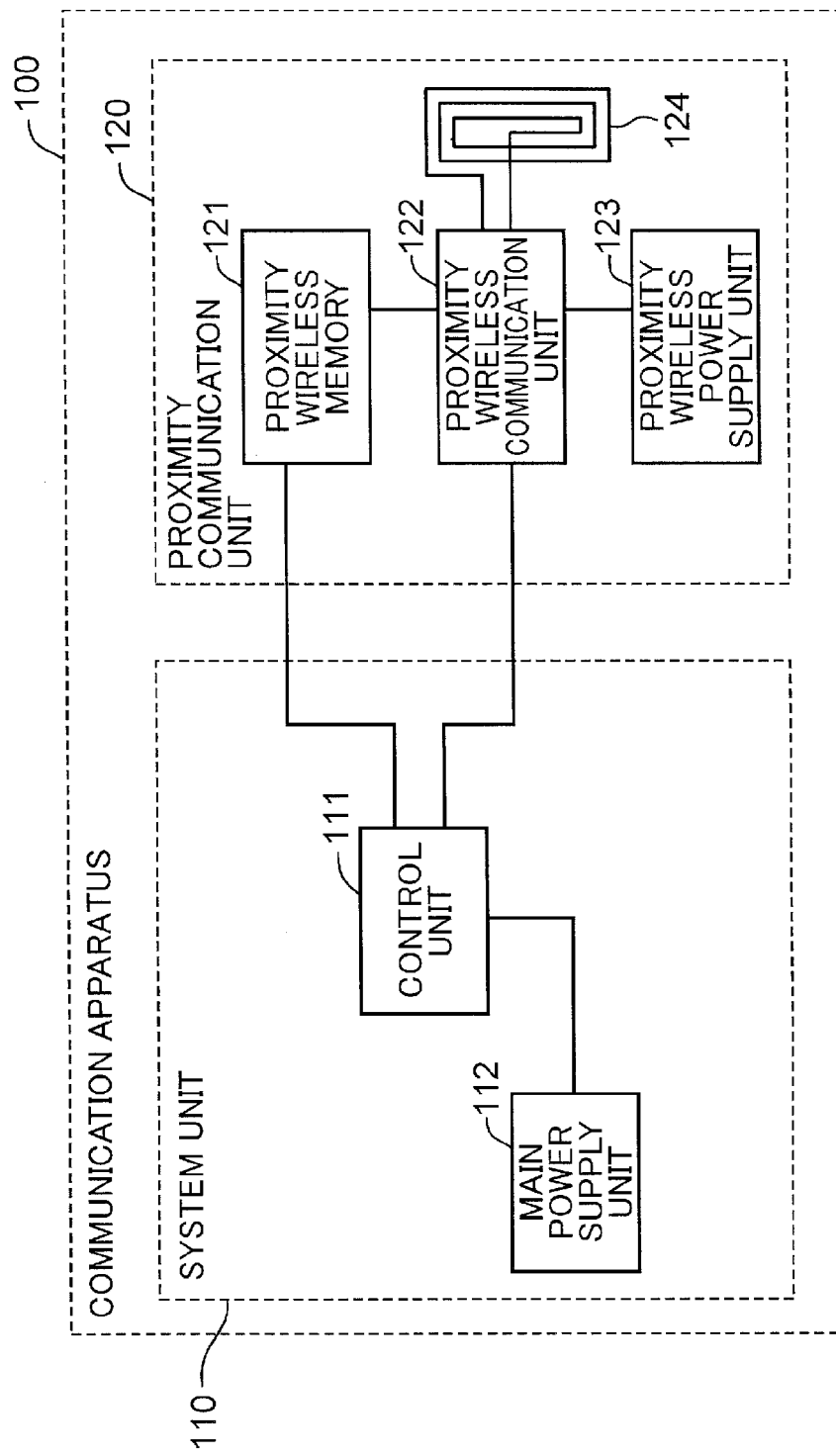
FIG. 1 is a block diagram of a communication apparatus that is applied to a communication system according of Embodiment 1 of the present invention.

FIG. 1 is a block diagram of a communication apparatus 100 that is applied to a communication system according of Embodiment 1 of the present invention. The communication system of this embodiment includes a portable terminal 200, and the communication apparatus 100 communicably configured by using both proximity wireless communication and high-speed wireless communication. This communication apparatus 100 is a communication apparatus obtained by mounting a communication module on an electric apparatus, for example. As the electric apparatus, a home appliance such as a washing machine, a rice cooker, an air conditioner, a refrigerator, a microwave oven, an oven, a lighting apparatus may be employed, or AV equipment such as a digital camera, a television, a Blu-ray recorder, a video recorder and a DVD recorder may be employed.

The communication apparatus 100 includes a system unit 110, and a proximity communication unit 120. The proximity communication unit 120 is configured by, for example, an RFID (Radio Frequency Identification) tag, and includes a proximity wireless memory 121 (an example of a non-volatile memory), a proximity wireless communication unit 122, and a proximity wireless power supply unit 123. The proximity wireless memory 121 is configured by a rewritable non-volatile memory such as an FeRAM (Ferroelectric Random Access Memory), a flash ROM, an EEPROM (Electrically Erasable Programmable Read-Only Memory), and an EPROM (Erasable Programmable Read Only Memory). Then, the proximity wireless memory 121 is driven by power supplied from the proximity wireless power supply unit 123, and stores an operation command of the communication apparatus 100.

Herein, the operation command is a command for operating the communication apparatus 100, and is configured by a single command or a plurality of commands. For example, in a case where the communication apparatus 100 is a digital camera, a command of activating the digital camera, or designating an operation mode such as a photographing mode and a playback mode is employed as the operation command. In a case where the communication apparatus 100 is cooking equipment such as a rice cooker, a microwave oven and an oven, a command of designating a cooking start time, a cooking end time, or a cooking mode is employed as the operation command. In a case where the communication apparatus 100 is a Blu-ray recorder, a video recorder, or a DVD recorder, a command such as a recording start time, a recording end time, a recording program, and a recording mode is employed as the operation command. In addition, a command according to the type of an electric apparatus that configures the communication apparatus 100 may be employed as the operation command.

The proximity wireless communication unit 122 includes an antenna 124, and is driven by power supplied from the proximity wireless power supply unit 123, to perform proximity wireless communication with the portable terminal 200. Additionally, the proximity wireless communication unit 122 receives an operation command transmitted from the portable terminal 200 via the antenna 124, to write the received operation command in the proximity wireless memory 121. Furthermore, when the antenna 124 receives radio waves, the proximity wireless communication unit 122 demodulates the radio waves and extracts a signal, to receive the extracted signal, and modulates a signal to be transmitted, to transmit the modulated signal as radio waves from the antenna 124.

As the proximity wireless communication, for example, a NFC (Near Field Communication) is employed. Recently, the high functionality of the portable terminal 200 is progressing by the appearance of smart phones, tablet terminals and the like, and such a portable terminal 200 is generally provided with the function of the proximity wireless communication. Therefore, the proximity communication unit 120 is mounted on an electric apparatus to configure the communication apparatus 100, thereby allowing communication with the portable terminal 200.

Herein, the proximity wireless communication unit 122 preferably writes the operation command in the proximity wireless memory 121, before a main power supply unit 112 is activated. Consequently, the portable terminal 200 can write the operation command in the proximity wireless memory 121 without waiting the activation of the communication apparatus 100 upon receipt of power supply from the main power supply unit 112, and the input period of the operation command can be shortened.

The proximity wireless power supply unit 123 includes, for example, a battery that supplies power to each block that configures the proximity communication unit 120, is activated by the radio waves of the proximity wireless communication transmitted from the portable terminal 200, and supplies power to the proximity wireless communication unit 122. Herein, when the antenna 124 receives the radio waves, the proximity wireless power supply unit 123 stars power supply to the proximity wireless communication unit 122. As the battery, a chargeable and dischargeable secondary battery may be employed, or a primary battery capable of discharging only may be employed.

The antenna 124 is supplied with a transmission signal from the proximity wireless communication unit 122, to transmit the transmission signal as radio waves to an external space, and receives the radio waves transmitted from the portable terminal 200, to supply the received radio waves to the proximity wireless communication unit 122.

The system unit 110 includes a control unit 111 and the main power supply unit 112. The control unit 111 is configured by, for example, a microcontroller, and is driven by power supplied from the main power supply unit 112, and reads out the operation command from the proximity wireless memory 121 to execute the operation command. Additionally, the control unit 111 previously stores firmware for controlling the electric apparatus that configures the communication apparatus 100, and executes the firmware to manage the whole control of the electric apparatus.

Herein, the control unit 111 preferably reads out the operation command from the proximity wireless memory 121, after the main power supply unit 112 is activated. Consequently, the control unit 111 can receive power supply from the main power supply unit 112 to execute the operation command, thereby enabling the suppression of the wasteful consumption of power supply for backup.

The main power supply unit 112 includes, for example, a power supply circuit that converts domestic power supplied from an outlet into power suitable for the driving of the electric apparatus, and the like. Then, the main power supply unit 112 is activated on the basis of a signal received from the proximity wireless communication unit 122, and supplies power to each block that configures the system unit 110 including the control unit 111. In a case where the communication apparatus 100 is configured by a portable apparatus, the main power supply unit 112 may be configured by a secondary battery or a primary battery.

Herein, the main power supply unit 112 is activated as follows, for example. When receiving an activation signal from the communication apparatus 100, the proximity wireless communication unit 122 outputs an interrupt to the control unit 111. Then, when the interrupt is output, the control unit 111 determines whether or not the communication apparatus 100 is in a sleep state or an OFF state. When the communication apparatus 100 is in the sleep state or the OFF state, the main power supply unit 112 is activated. Herein, a power supply for backup may be provided in the system unit 110 such that the control unit 111 can drive, even when the communication apparatus 100 is in the sleep state or the OFF state. As the power supply for backup, a primary battery or a secondary battery may be employed. When the communication apparatus 100 is in an activation state, the main power supply unit 112 does not need to be activated, and therefore control unit 111 does not activate the main power supply unit 112. The activation state indicates a case where a power supply of a household electrical appliance is in an ON state, and not in the sleep state.

Figure 2:
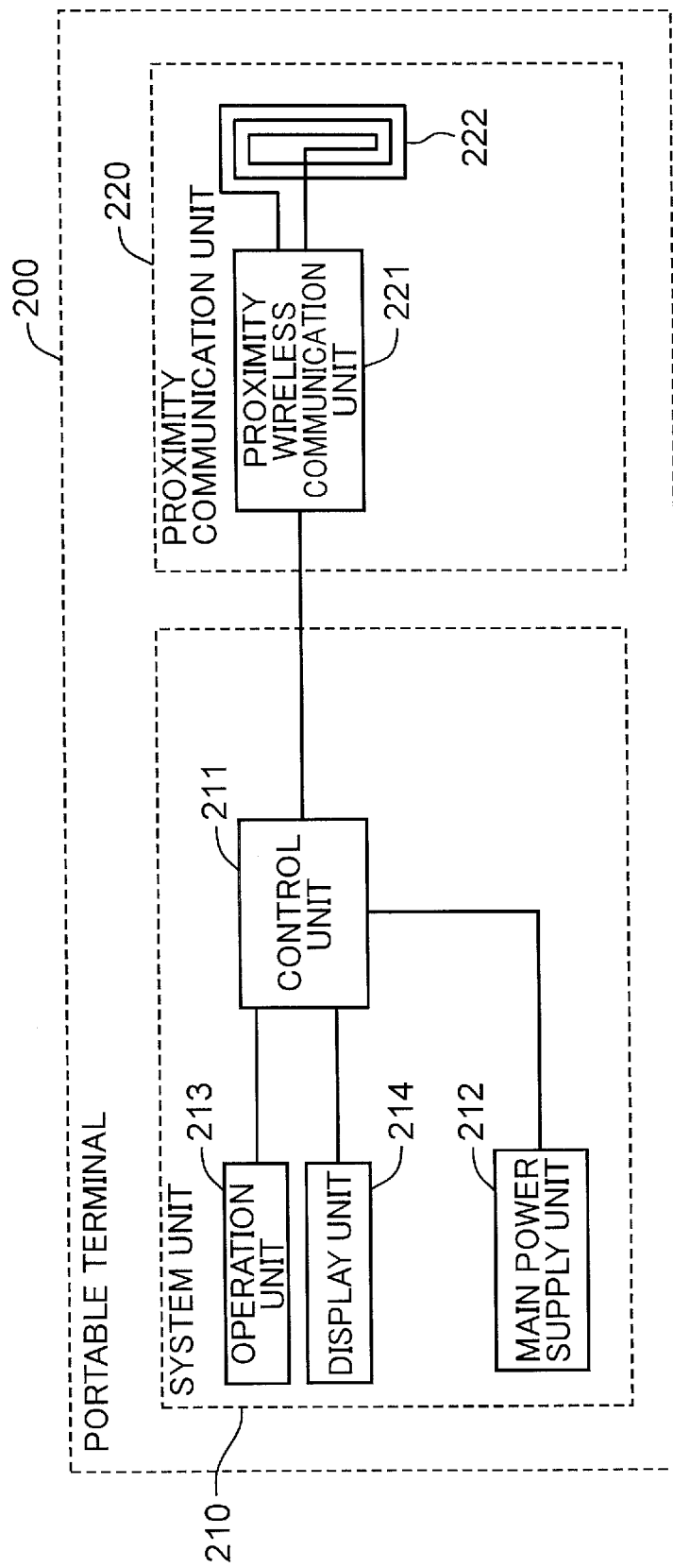
FIG. 2 is a block diagram of a portable terminal that is applied to the communication system according of Embodiment 1 of the present invention.

FIG. 2 is a block diagram of the portable terminal 200 applied to the communication system according to Embodiment 1 of the present invention. The portable terminal 200 is configured by, for example, a touch panel type portable terminal such as a smart phone and a tablet terminal. However, the portable terminal 200 is not limited to this, and a button type portable phone, or a PDA (Personal Digital Assistant) may be employed as the portable terminal 200. The portable terminal 200 includes a system unit 210 and a proximity communication unit 220. The system unit 210 includes a control unit 211, a main power supply unit 212, an operation unit 213, and a display unit 214.

The control unit 211 is configured by, for example, a microcontroller that executes an operating system, and manages the whole control of the portable terminal 200. The main power supply unit 212 is configured by, for example, a battery pack including a secondary battery, and supplies power to each block that configures the portable terminal 200.

The operation unit 213 is configured by, for example, a touch panel, or an operation button, and accepts operation from a user. The display unit 214 is configured by, for example, a display apparatus such as a liquid crystal panel that includes a touch panel, and displays various images under the control of the control unit 211.

The proximity communication unit 220 is configured by, for example, a RFID reader/writer, includes a proximity wireless communication unit 221, and perform proximity wireless communication with the communication apparatus 100. The proximity wireless communication unit 221 includes an antenna 222, demodulates radio waves received from the antenna 222 to extract a signal, and supply the extracted signal to the control unit 211, and modulates a signal to be transmitted, to transmit the signal as radio waves from the antenna 222.

The antenna 222 receives the radio waves transmitted from the communication apparatus 100 to supply the received radio waves to the proximity wireless communication unit 221, and transmits the signal modulated by the proximity wireless communication unit 221, as radio waves.

Figure 3:
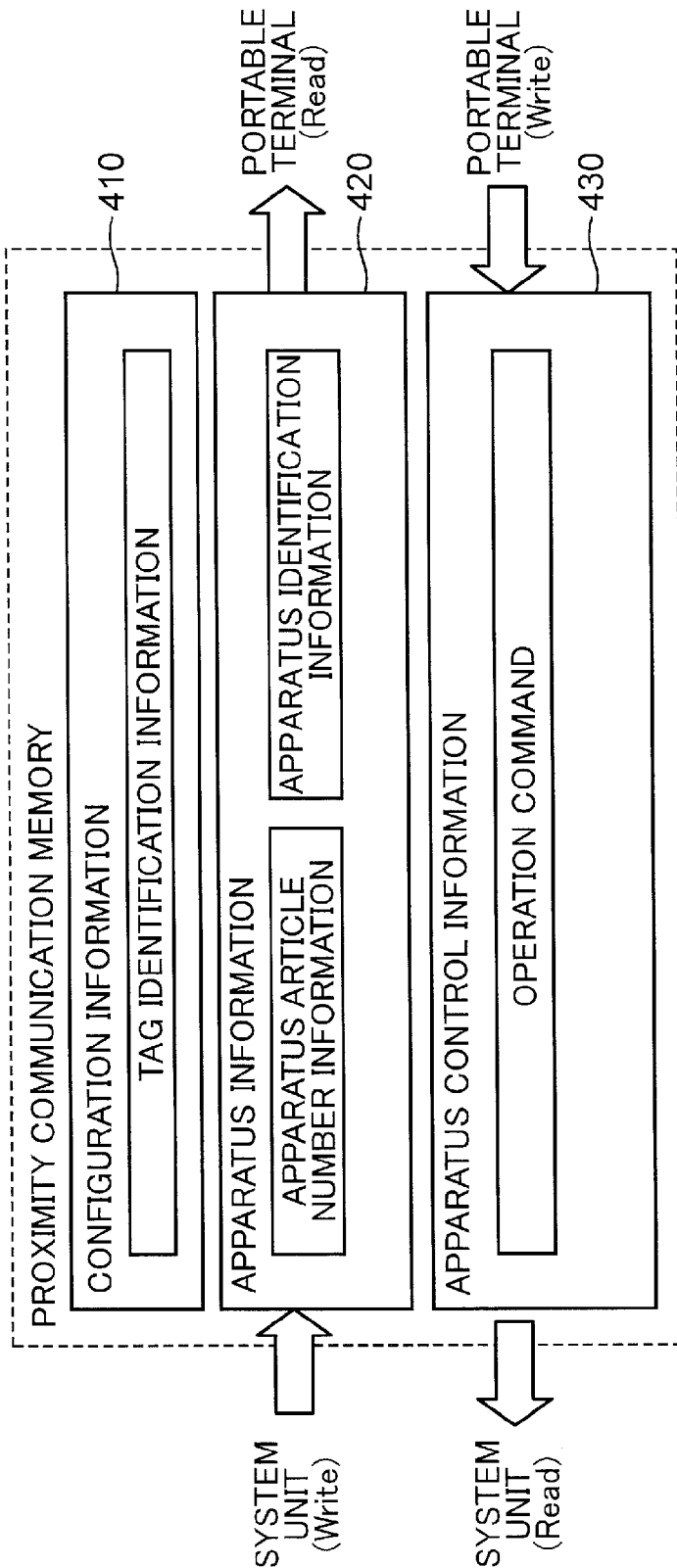
FIG. 3 is a configuration diagram of data stored by a proximity wireless memory, in Embodiment 1 of the present invention.

FIG. 3 is a configuration diagram of data stored by the proximity wireless memory 121, in Embodiment 1 of the present invention. The proximity wireless memory 121 stores configuration information 410, apparatus information 420, and apparatus control information 430.

The configuration information 410 is information peculiar to the proximity communication unit 120 that configures the communication apparatus 100. The configuration information includes tag identification information. The tag identification information is identification information for uniquely identifying the proximity communication unit 120, and, for example, the serial number of the proximity communication unit 120 is employed.

The apparatus information 420 is information on an electric apparatus that configures the communication apparatus 100. The apparatus information 420 includes apparatus article number information, and apparatus identification information. The apparatus article number information is information indicating the article number of the electric apparatus that configures the communication apparatus 100. Herein, the article number is a number for distinguishing the electric apparatus from other electric apparatus with different shape and color on commodity management. The apparatus identification information is identification information for uniquely identifying the electric apparatus that configures the communication apparatus 100, and, for example, the serial number of the electric apparatus is employed.

The apparatus control information 430 is information on the control of the electric apparatus that configures the communication apparatus 100. The apparatus control information 430 includes an operation command.

Herein, the configuration information 410 is previously stored in the proximity wireless memory 121. The apparatus information 420 is provided from the system unit 110 that configures the communication apparatus 100, and is written by the proximity wireless communication unit 122. The apparatus control information 430 is transmitted from the portable terminal 200 by the proximity wireless communication, and written by the proximity wireless communication unit 122.

Figure 4:
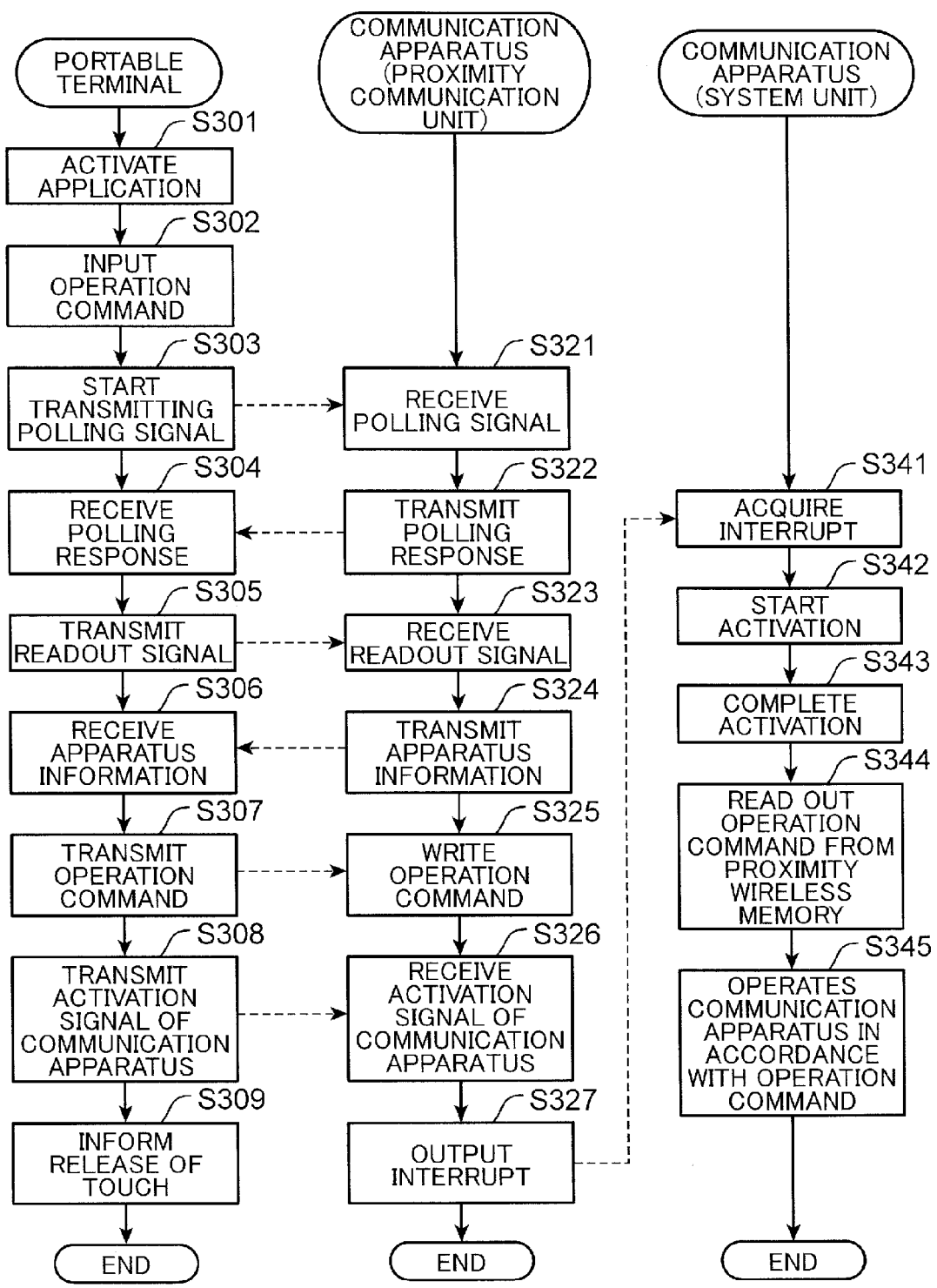
FIG. 4 is a sequence diagram showing operation of the communication system according to Embodiment 1 of the present invention.

FIG. 4 is a sequence diagram showing operation of the communication system according to Embodiment 1 of the present invention. First, the portable terminal 200 activates application software for operating the communication apparatus 100 by remote control (S301). Then, the portable terminal 200 makes a user input an operation command (S302). When the input of the operation command is finished, the portable terminal 200 is held up over (is brought close to, is brought into touch with) the proximity communication unit 120.

The portable terminal 200 starts transmitting a polling signal by using the proximity wireless communication (S303). When receiving the polling signal (S321), the proximity communication unit 120 of the communication apparatus 100 transmits a polling response (S322). Then, the portable terminal 200 receives the polling response (S304).

The portable terminal 200 transmits a readout signal for reading out the apparatus information 420 stored in the proximity wireless memory 121, to the proximity communication unit 120 (S305). Then, the proximity communication unit 120 receives the readout signal (S323), and reads out the apparatus information 420 from the proximity wireless memory 121 to transmit the apparatus information 420 (S324).

The portable terminal 200 receives the apparatus information 420 transmitted from the proximity communication unit 120 (S306). Consequently, the portable terminal 200 can determine from the apparatus article number information included in the apparatus information 420 whether or not the relevant communication apparatus 100 is a communication apparatus capable of performing remote control with the application software activated in S301.

The portable terminal 200 transmits the operation command input in S302, to the proximity communication unit 120 (S307). Then, the proximity communication unit 120 receives and writes the operation command in the proximity wireless memory 121 (S325).

The portable terminal 200 transmits an activation signal of the communication apparatus 100 to the proximity communication unit 120 (S308). Then, the proximity communication unit 120 receives the activation signal (S326).

The portable terminal 200 informs the user that the holding of the portable terminal 200 over the proximity communication unit 120 of the communication apparatus 100 is allowed to be finished (release of touch) (S309). In this case, the portable terminal 200 informs the user of the release of the touch simply by outputting a sound effect, or displaying, on the display unit, information indicating that the release of the touch is allowed. Consequently, it is possible to make the user recognize that the portable terminal 200 may be separated from the proximity communication unit 120.

The proximity communication unit 120 outputs an interrupt to the system unit 110 (S327). The control unit 111 of the system unit 110 acquires the interrupt (S341), and activates the main power supply unit 112 to start the activation of the communication apparatus 100 (S342). When the activation of the communication apparatus 100 is completed (S343), the control unit 111 reads out the operation command from the proximity wireless memory 121 (S344). Then, the control unit 111 operates the communication apparatus 100 in accordance with the operation command (S345).

Thus, according to the communication system of Embodiment 1, when radio waves of the proximity wireless communication are transmitted from the portable terminal 200, the proximity wireless power supply unit 123 is activated, the proximity wireless communication unit 122 is driven by power from the proximity wireless power supply unit 123, and the operation command transmitted from the portable terminal 200 is written in the proximity wireless memory 121. Accordingly, even when the communication apparatus 100 is in a sleep state or an OFF state, the user can operate the portable terminal 200 to write the operation command in the communication apparatus 100.

When the operation command is written, the main power supply unit 212 is activated, and the communication apparatus 100 is operated in accordance with the operation command. Consequently, the user can operate the communication apparatus 100 simply by inputting the operation command in the portable terminal 200, and holding the portable terminal 200 up over the proximity communication unit 120 of the communication apparatus 100 once (one touch).

When the writing of the operation command is finished, the activation process of the communication apparatus 100 is performed in the system unit 110. Therefore, the user only needs to hold the portable terminal 200 up over the communication apparatus 100 (bring the portable terminal 200 close to the communication apparatus 100) only for a period from when the operation command is input to when the operation command is transmitted, and the user does not need to hold the portable terminal 200 up over the communication apparatus 100 for a period from when the operation command is input to when the activation of the communication apparatus 100 is completed. Therefore, a period during the portable terminal 200 is held up over (brought close to) the communication apparatus 100 can be shortened, and an operational feeling capable of operating the communication apparatus 100 by holding the portable terminal 200 up over the communication apparatus 100 once, which is not achieved before, can be given to the user. Consequently, it is possible to improve operability to the communication apparatus 100.

In FIG. 4, the portable terminal 200 transmits the activation signal to the proximity communication unit 120 in S308. However, this process may be omitted. In this case, the proximity communication unit 120 may output an interrupt to the system unit 110 upon receipt of the operation command transmitted from the portable terminal 200 as a trigger, and activate the communication apparatus 100.

The process of S302 where the operation command is input is provided next to S301 in FIG. 4, but is not limited to this. For example, the operation command may be input during the execution of the processes of S303 to S307.

A specific example of Embodiment 1 will be now described. First, a case where the communication apparatus 100 is configured by a rice cooker is now described as the specific example. In S302, a user inputs a cooking command of designating a cooking mode such as plain rice, Takikomi-gohan (rice seasoned with soy sauce and vegetables), rice porridge, and a time designation command of designating a cooking start time are input as operation commands. Then, in S325, these commands are written in the proximity wireless memory 121. Consequently, in the rice cooker which is in a sleep state or an OFF state, the cooking command and the time designation command are written in the proximity wireless memory 121. Then, when the rice cooker receives an activation signal and the activation is completed, the rice cooker reads out the cooking command and the time designation command from the proximity wireless memory 121 (S344), and the cooking mode and the cooking start time are set, and thereafter, the rice cooker enters an OFF state. Then, when the cooking start time arrives, the rice cooker is activated in the preset cooking mode, and starts cooking.

Now, a case where the communication apparatus 100 is configured by a Blu-ray recorder will be described. In S302, a user inputs a reservation video recording command that a program A is recorded from time t1 to time t2 on Tuesday, as an operation command. Then, in S325, this command is written in the proximity wireless memory 121. Consequently, in the Blu-ray recorder which is in a sleep state or an OFF state, the reservation video recording command is written in the proximity wireless memory 121. Then, when the Blu-ray recorder receives an activation signal, and the activation is completed, the reservation video recording command is read out from the proximity wireless memory 121 (S344), the reservation of a recording day of the week, a recording start time, a recording end time, and a recording program is accepted, and a power supply is turned off. When the recording start time of the recording day of the week arrives, the Blu-ray recorder is activated to start recording the program. When the recording end time arrives, the Blu-ray recorder finishes recording, and the power supply is turned off.

An apparatus mounted with OS such as a Blu-ray recorder needs to read the OS at the time of activation, and therefore it takes time to activate. However, in this embodiment, the reservation video recording command is written in the proximity wireless memory 121 before the activation. Accordingly, when the user simply transmits the reservation video recording command to the Blu-ray recorder by proximity wireless communication, the Blu-ray recorder is automatically activated, and the reservation video recording command is accepted. Therefore, after Blu-ray recorder is activated, the user can complete the reservation of the recording program to the Blu-ray recorder without waiting the acceptance of the reservation video recording command after the end of the reading of the OS. Accordingly, when the transmission of the reservation video recording command to the Blu-ray recorder is completed, the user can immediately go out of a room where the Blu-ray recorder is placed. Consequently, the user can make a program reservation in a very short time.

As the operation command, a command group configured from a plurality of commands may be employed. For example, the user may collectively input, to the portable terminal 200, the reservation video recording command indicating that the program A is recorded from the time t1 to the time t2 on Tuesday, and a reservation video recording command indicating that a program B is recorded from time t3 to time t4 on Saturday, and transmit these reservation video recording commands to the Blu-ray recorder collectively. Consequently, it is possible to transmit a plurality of reservation video recording commands to the Blu-ray recorder collectively, and to thereby reduce the labor of the user.

Alternatively, the user may input such a command group as to cause the communication apparatus 100 to perform a procedure K1, a procedure K2 and a procedure K3, as the operation command.

(Embodiment 2)

Figure 5:
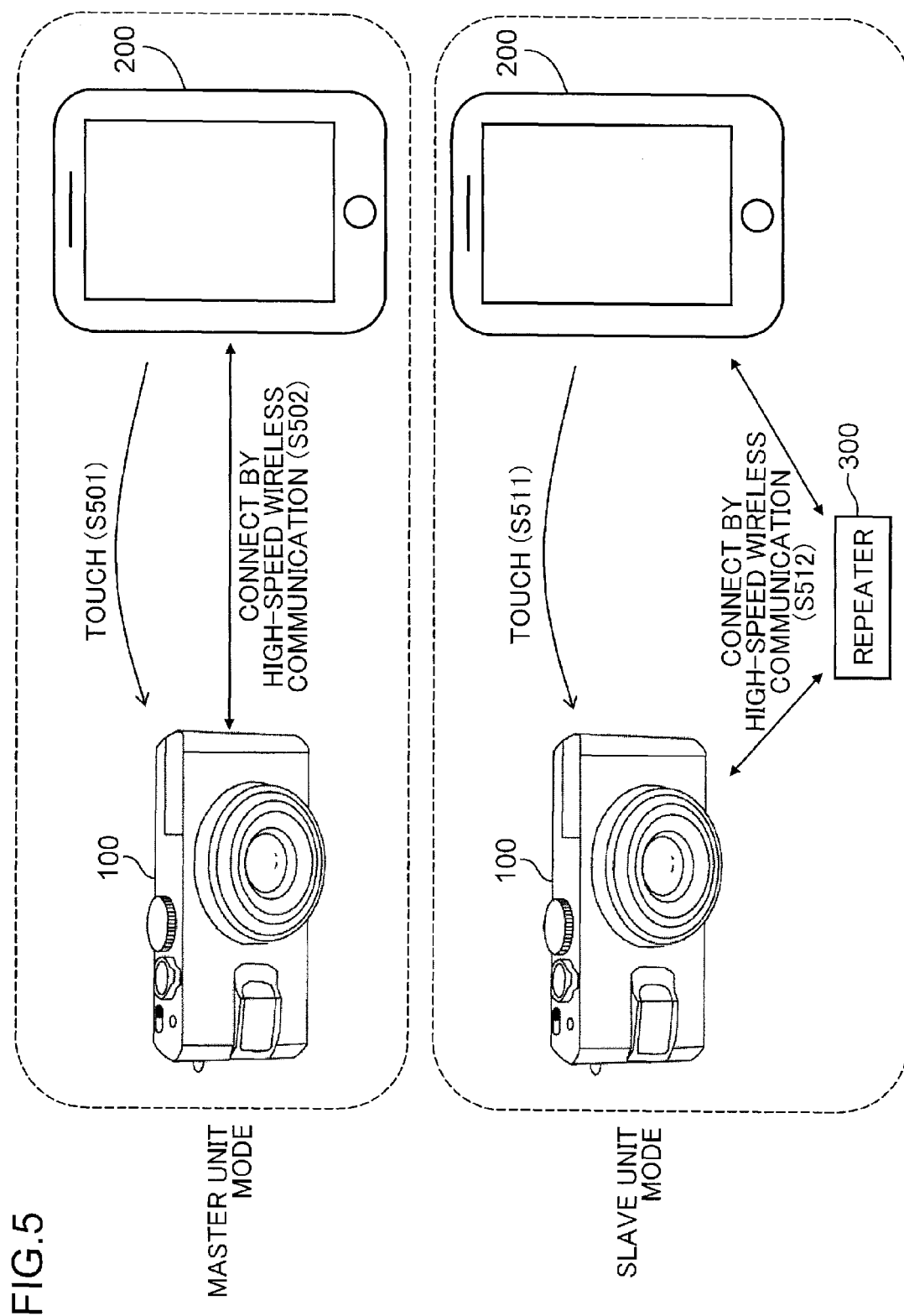
FIG. 5 is a diagram for illustrating the outline of operation of a communication system according to Embodiment 2 of the present invention.

FIG. 5 is a diagram for illustrating the outline of operation of a communication system according to Embodiment 2 of the present invention. In this embodiment, components identical to those of Embodiment 1 are denoted by the same reference numerals, and description thereof will be omitted. In this embodiment, a communication apparatus 100 operates either in a master unit mode or in a slave unit mode. The master unit mode is a mode in which the communication apparatus 100 serves as a master unit, and accepts the connection of high-speed wireless communication from a portable terminal 200 which serves as a slave unit. The slave unit mode is a mode in which the portable terminal 200 serves as the master unit, and accepts the connection of high-speed wireless communication from the communication apparatus 100 which serves as the slave unit.

As shown in FIG. 5, in the master unit mode, when the portable terminal 200 is brought close to (into touch with) the communication apparatus 100 (S501), the communication apparatus 100 notifies the portable terminal 200 of a connection destination identifier of high-speed wireless communication whose connection destination is the communication apparatus 100. The portable terminal 200 is connected to the communication apparatus 100 that is the connection destination, on the basis of the notified connection destination identifier of the high-speed wireless communication (S502).

On the other hand, in the slave unit mode, when the portable terminal 200 is brought close to (into touch with) the communication apparatus 100 (S511), the portable terminal 200 notifies the communication apparatus 100 of a connection destination identifier of a repeater 300 that is currently connected by the high-speed wireless communication. The communication apparatus 100 is connected to the repeater 300 by the high-speed wireless communication on the basis of the notified connection destination identifier of the repeater 300. Consequently, the portable terminal 200 communicates with the communication apparatus 100 via the repeater 300 by the high-speed wireless communication (S512).

When the portable terminal 200 that is not connected to the repeater 300 is set to the master unit, the portable terminal 200 performs a tethering function to function as a network adapter of the communication apparatus 100. In the current portable terminal standard, in a case where the portable terminal 200 executes the tethering function, the portable terminal 200 is allowed only to relay data, and such a function as to control an external apparatus is restricted. Therefore, in this embodiment, even in a case where the portable terminal 200 is not connected to the repeater 300, the portable terminal 200 is set to the slave unit such that the portable terminal 200 can control the communication apparatus 100 by using the high-speed wireless communication.

Figure 6:
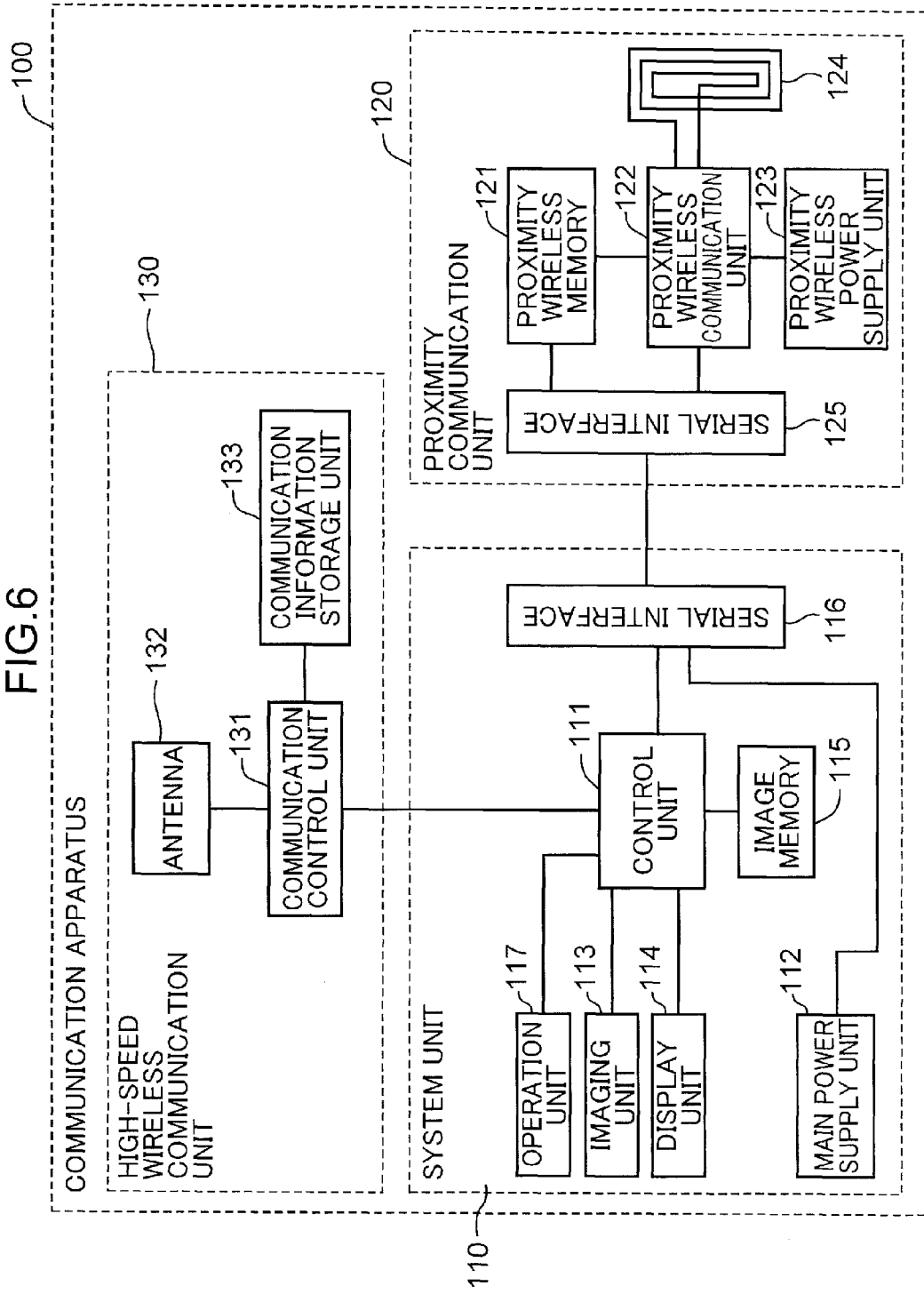
FIG. 6 is a block diagram of a communication apparatus that is applied to the communication system according to Embodiment 2 of the present invention.

FIG. 6 is a block diagram of the communication apparatus 100 that is applied to the communication system according to Embodiment 2 of the present invention. In this embodiment, a digital camera is employed as the communication apparatus 100. The communication apparatus 100 further includes a high-speed wireless communication unit 130 in addition to the configuration of FIG. 1.

The high-speed wireless communication unit 130 is configured by a communication module that causes the communication apparatus 100 to communicate by using high-speed wireless communication. In this embodiment, as the high-speed wireless communication, wireless communication with higher speed than the proximity wireless communication can be employed, and for example, a wireless LAN in compliance with the communication standard of Wi-Fi (registered trademark) is employed. The high-speed wireless communication unit 130 can operate in a communication mode of either the master mode in which the communication apparatus 100 accepts the connection from the portable terminal 200 which serves as the slave unit, or the slave unit mode in which the communication apparatus 100 is connected to the portable terminal 200 which serves as the master unit.

The high-speed wireless communication unit 130 includes a communication control unit 131, an antenna 132, and a communication information storage unit 133.

The communication control unit 131 modulates a signal to be transmitted by a modulate system in compliance with the communication standard of a wireless LAN, and outputs the modulated signal as radio waves from the antenna 132. Additionally, the communication control unit 131 demodulates radio waves received from the antenna 132 and extracts a signal.

The antenna 132 is configured by an antenna for a wireless LAN. The communication information storage unit 133 stores communication information necessary for wireless LAN communication. The communication information includes, for example, a connection destination identifier whose connection destination is the communication apparatus 100, a password required when the portable terminal 200 connects the communication apparatus 100, and the like. As the connection destination identifier, an identifier in compliance with the communication standard of a wireless LAN can be employed, and in this embodiment, an SSID (Service Set Identifier) is employed.

In addition to the configuration of FIG. 1, a system unit 110 further includes an imaging unit 113, a display unit 114, an image memory 115, a serial interface 116, and an operation unit 117. In addition to the configuration of FIG. 1, a proximity communication unit 120 further includes a serial interface 125.

The imaging unit 113 is configured by, for example, a CCD image sensor or a CMOS image sensor, and photographs an object under the control of a control unit 111. The display unit 114 is configured by, for example, a liquid crystal panel or an organic EL panel, and displays various images under the control of the control unit 111. In this embodiment, particularly, the display unit 114 displays a live view image that is photographed by the imaging unit 113, or a photographed image that is photographed in accordance with a photographing instruction of a user by the imaging unit 113. The image memory 115 stores the photographed image that is photographed by the imaging unit 113.

The serial interface 116 converts a parallel signal output from the control unit 111 into a serial signal, to output the serial signal to the proximity communication unit 120, and converts a serial signal output from the proximity communication unit 120 into a parallel signal, to supply the parallel signal to the control unit 111. The operation unit 117 includes various buttons such as a shutter button and an operation mode setting button.

In this embodiment, the control unit 111 determines on the basis of an operation command written in a proximity wireless memory 121 whether the high-speed wireless communication unit 130 is operated in a master unit mode or in a slave unit mode.

Specifically, in a case where communication mode information described as the operation command in apparatus control information 430 indicates the master unit mode, the control unit 111 only needs to operate the high-speed wireless communication unit 130 in the master unit mode. In a case where the communication mode information indicates the slave unit mode, the control unit 111 only needs to operate high-speed wireless communication unit 130 in the slave unit mode.

Alternatively, in this embodiment, in a case where the portable terminal 200 is connected to the repeater 300, the proximity wireless communication unit 122 receives a repeater SSID (an example of a second connection destination identifier) whose connection destination is the repeater 300, from the portable terminal 200, and writes the repeater SSID in the proximity wireless memory 121. Therefore, in a case where the repeater SSID is not stored in the proximity wireless memory 121, the control unit 111 operates the high-speed wireless communication unit 130 in the master unit mode. In a case where the repeater SSID is stored in the proximity wireless memory 121, the high-speed wireless communication unit 130 may be operated in the master unit mode.

Figure 8:
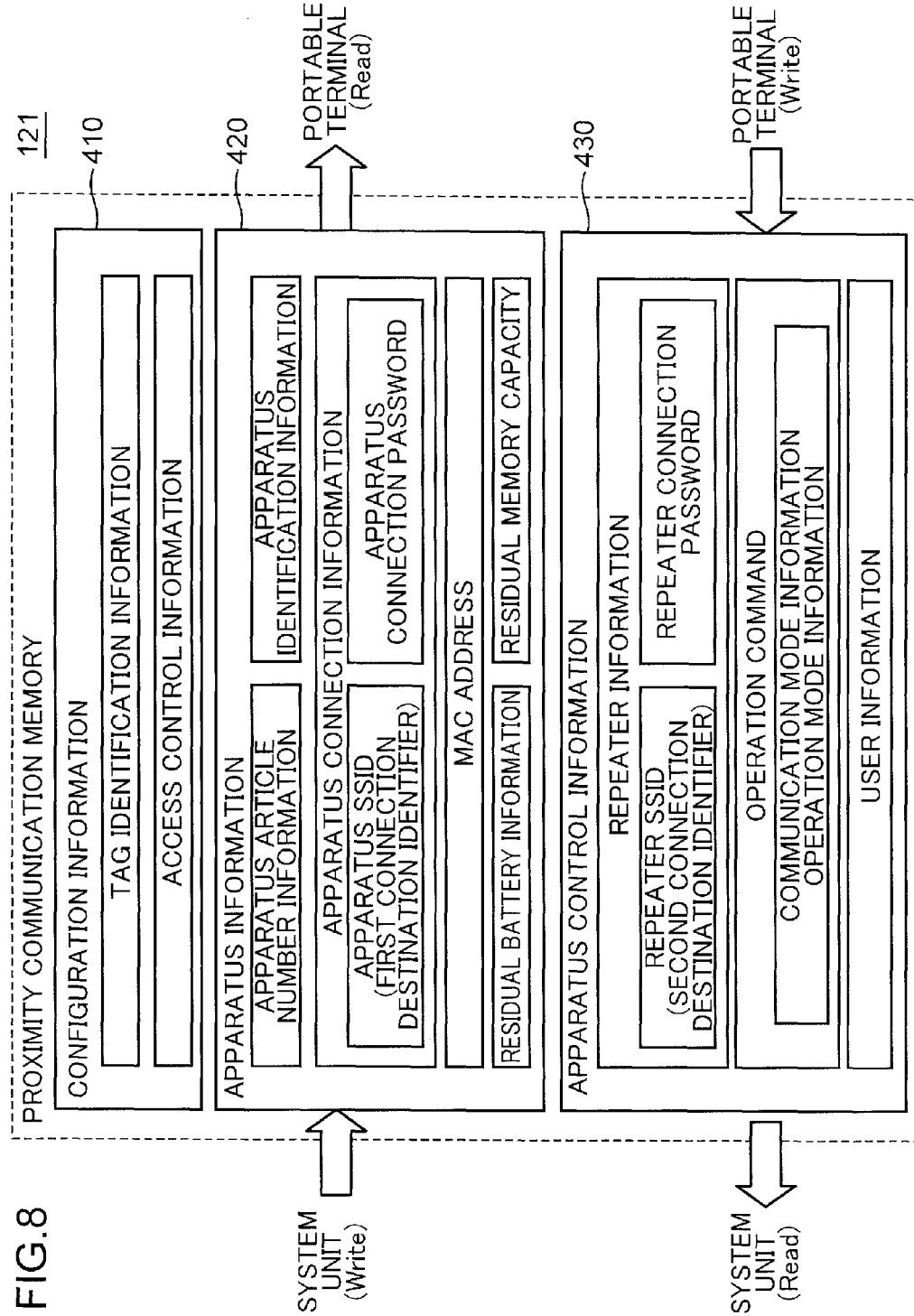
FIG. 8 is a configuration diagram of data stored by a proximity wireless memory, in Embodiment 2 of the present invention.

FIG. 8 is a configuration diagram of data stored by the proximity wireless memory 121, in Embodiment 2 of the present invention. FIG. 8 is different from FIG. 3 in that access control information is further included as configuration information 410, apparatus connection information, a MAC address, residual battery information, and residual memory capacity are further included as apparatus information 420, and repeater information and user information are further included as the apparatus control information 430.

The access control information included in the configuration information 410 is information for regulating a communication procedure or the like for enhancing the security of proximity wireless communication. The apparatus connection information included in the apparatus information 420 is communication information notified when the high-speed wireless communication is performed in the master unit mode, and includes an apparatus SSID (an example of a first connection destination identifier), and an apparatus connection destination password. The apparatus SSID is an SSID notified when the high-speed wireless communication is used in the master unit mode. In the master unit mode, the communication apparatus 100 is the connection destination, and therefore the apparatus SSID is the SSID of the communication apparatus 100.

The apparatus connection password is a password required when the portable terminal 200 is a slave unit, and is connected to the communication apparatus 100 that is a master unit.

The MAC address is the MAC address of the communication apparatus 100. This MAC address is a MAC address that is preset for the high-speed wireless communication unit 130.

The residual battery information indicates the residual capacity of a secondary battery (not shown) included in the communication apparatus 100. The residual memory capacity indicates the residual memory capacity of the image memory 115.

The repeater information included in the apparatus control information 430 is information on the repeater 300 notified when the communication apparatus 100 is the slave unit mode, performs high-speed wireless communication with the portable terminal 200, and includes a repeater SSID and a repeater connection password.

The repeater SSID is the SSID of the repeater 300. The repeater connection password is a password required when the communication apparatus 100 and the portable terminal 200 is connected to the repeater 300.

The user information is information for performing user authentication. For example, in a case where the communication apparatus 100 is accessed from an external apparatus, the user information is transmitted from the external apparatus. And, in a case where the user information matches user information stored in the proximity wireless memory 121, the access of the external apparatus is allowed.

Returning to FIG. 6, the control unit 111 previously writes the apparatus SSID that is an SSID notified in a case where the high-speed wireless communication unit 130 is operated in the master unit mode, in the proximity wireless memory 121, prior to the communication of the portable terminal 200. Therefore, when the proximity wireless communication unit 122 is accessed from the portable terminal 200, the apparatus SSID can be transmitted to the portable terminal 200 without waiting for the activation of the main power supply unit 112.

In a case where the proximity wireless communication unit 122 receives a readout signal by the proximity wireless communication from the portable terminal 200, the apparatus SSID stored in the proximity wireless memory 121 is transmitted to the portable terminal 200. Additionally, in a case where the portable terminal 200 is not connected to the repeater 300, the proximity wireless communication unit 122 receives communication mode information indicating the master unit mode from the portable terminal 200, to write the communication mode information in the proximity wireless memory 121.

On the other hand, in a case where the portable terminal 200 is connected to the repeater 300, the proximity wireless communication unit 122 receives the repeater SSID that is the SSID of the repeater 300, from the portable terminal 200, to write the relevant repeater SSID in the proximity wireless memory 121.

Figure 7:
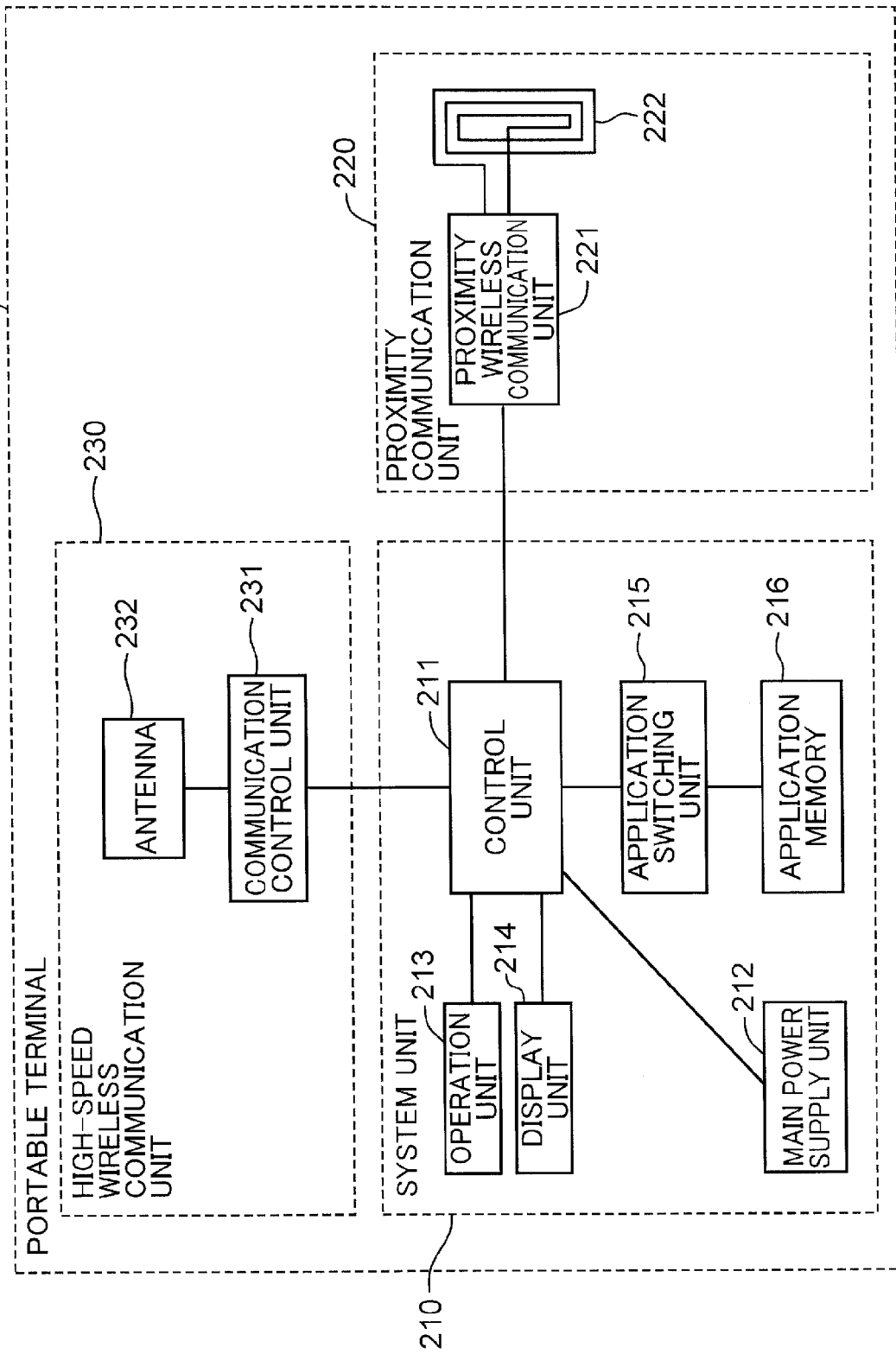
FIG. 7 is a block diagram of a portable terminal that is applied to the communication system according to Embodiment 2 of the present invention.

FIG. 7 is a block diagram of the portable terminal 200 that is applied to the communication system according to Embodiment 2 of the present invention. The portable terminal 200 of this embodiment further includes a high-speed wireless communication unit 230 in addition to the portable terminal 200 shown in FIG. 2, and a system unit 210 further includes an application switching unit 215 and an application memory 216.

The high-speed wireless communication unit 230 is configured by a communication module for a wireless LAN, similarly to the high-speed wireless communication unit 130 of the communication apparatus 100, and includes a communication control unit 231 and an antenna 232.

The communication control unit 231 modulates a signal to be transmitted, by a modulate system in compliance with the communication protocol of a wireless LAN, to cause the antenna 232 to output the modulated signal as radio waves. Additionally, the communication control unit 231 demodulates radio waves received from the antenna 232, to extract a signal. The antenna 232 is configured by an antenna for a wireless LAN.

The application switching unit 215 reads out application software for the portable terminal 200 corresponding to an electric apparatus that configures the communication apparatus 100, from the application memory 216, to cause the control unit 211 to execute the application software. For example, in a case where the communication apparatus 100 is a digital camera, the application switching unit 215 reads out application software for the portable terminal 200 corresponding to the digital camera, from the application memory 216, to cause the control unit 211 to execute the application software. Additionally, in a case where the communication apparatus 100 is a Blu-ray recorder, the application switching unit 215 reads out application software for the portable terminal 200 corresponding to the Blu-ray recorder, from the application memory 216, to cause the control unit 211 to execute the application software.

The application memory 216 is configured by a rewritable non-volatile memory, and stores the application software for the portable terminal 200 corresponding to the electric apparatus that configures the communication apparatus 100.

Figure 9:
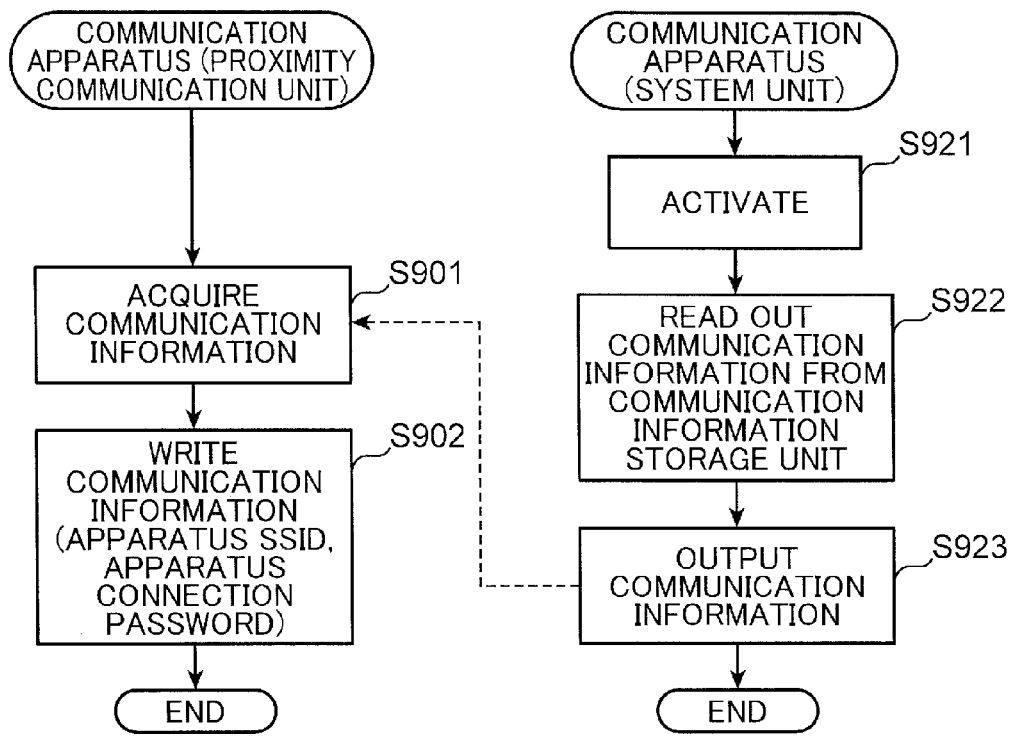
FIG. 9 is a sequence diagram showing processes performed when a control unit previously writes an apparatus SSID in the proximity wireless memory, in Embodiment 2 of the present invention.

FIG. 9 is a sequence diagram showing processes performed when the control unit 111 previously writes the apparatus SSID in the proximity wireless memory 121, in Embodiment 2 of the present invention. First, when a user turns on a power switch of the communication apparatus 100 and the communication apparatus 100 is activated (S921), the control unit 111 of the system unit 110 reads out the communication information stored in the communication information storage unit 133 (S922). Herein, the communication information includes an apparatus SSID and an apparatus connection password.

The control unit 111 outputs the communication information to the proximity communication unit 120 (S923). Then, the proximity wireless communication unit 122 of the proximity communication unit 120 receives the communication information (S901), and writes the communication information in the proximity wireless memory 121 (S902). Consequently, the apparatus SSID and the apparatus connection password shown in FIG. 8 are updated, and the apparatus SSID and the apparatus connection password are previously written in the proximity wireless memory 121, prior to communication with the portable terminal 200.

In FIG. 9, the control unit 111 writes the communication information in the proximity wireless memory 121 when the power switch is turned on. However, the present invention is not limited to this. In a case where the user changes the setting of the communication information after the activation of the communication apparatus 100, the control unit 111 may write the changed communication information in the proximity wireless memory 121.

Figure 10:
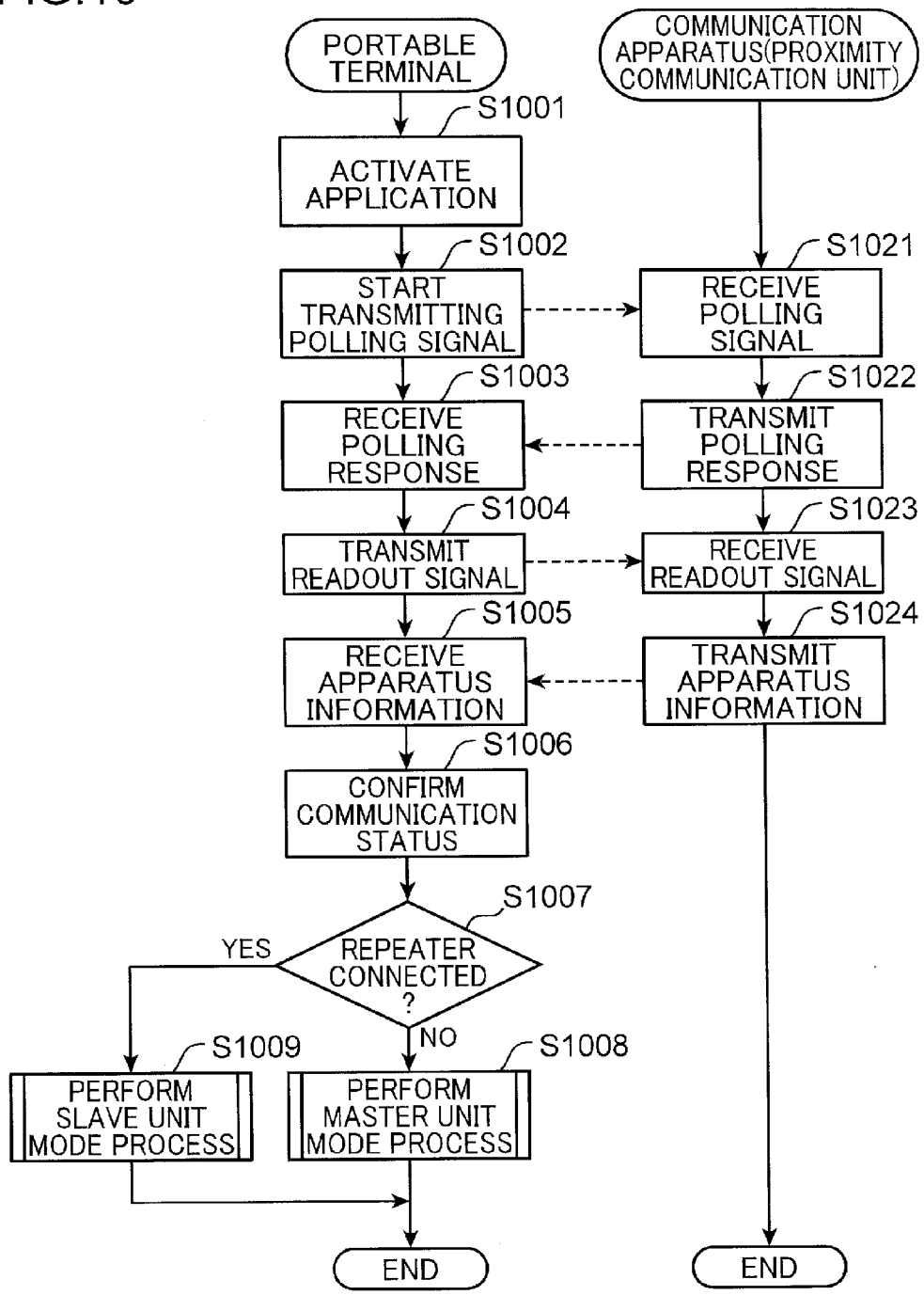
FIG. 10 is a sequence diagram showing the processes of proximity wireless communication performed until the communication system of Embodiment 2 of the present invention performs high-speed wireless communication.

FIG. 10 is a sequence diagram showing the processes of proximity wireless communication performed until the communication system of Embodiment 2 of the present invention performs high-speed wireless communication. S1001, S1002, S1003, S1004 and S1005 are the same as S301, S303, S304, S305 and S306 in FIG. 4, and therefore description thereof will be omitted. Additionally, S1021, S1022, S1023 and S1024 are the same as S321, S322, S323 and S324 in FIG. 4, and therefore description thereof will be omitted.

In the S1006, the portable terminal 200 confirms a communication status. Then, in a case where the portable terminal 200 is connected to the repeater 300 (YES in S1007), namely, in a case where communication connection between the portable terminal 200 and the repeater 300 by a wireless LAN is established, the portable terminal 200 performs a slave unit mode process for setting to a slave unit mode in which the portable terminal 200 serves as a master unit, and the communication apparatus 100 serves as a slave unit (S1009). On the other hand, in a case where the portable terminal 200 is not connected to the repeater 300 (NO in S1007), namely, in a case where communication connection between the portable terminal 200 and the repeater 300 by the wireless LAN is not established, the portable terminal 200 performs a master unit mode process for setting to a master unit mode in which the portable terminal 200 serves as the slave unit, and the communication apparatus 100 serves as the master unit (S1008).

Figure 11:
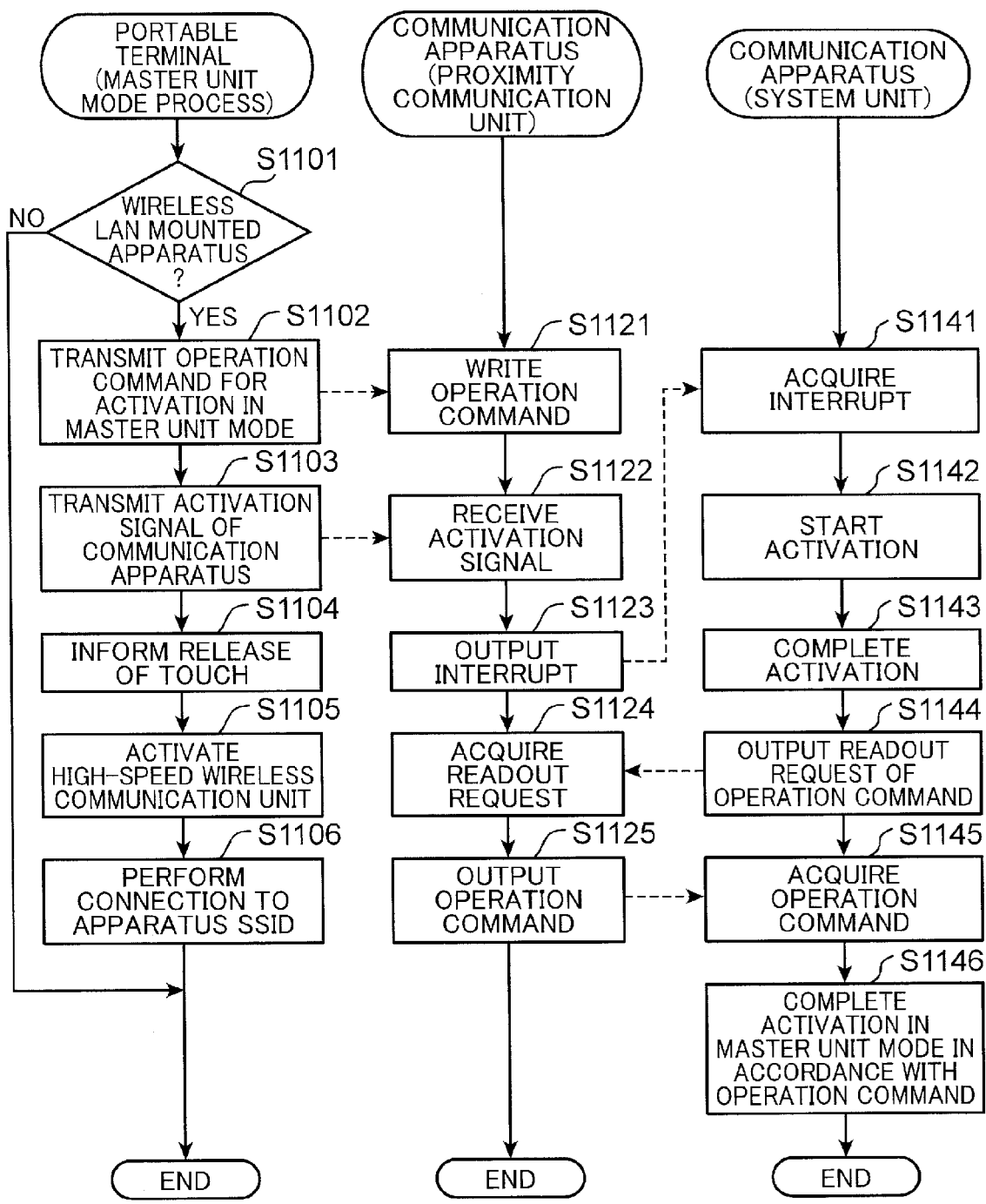
FIG. 11 is a sequence diagram showing the processes of the communication system performed when the portable terminal performs a master unit mode process.

FIG. 11 is a sequence diagram showing the processes of the communication system performed when the portable terminal 200 performs the master unit mode process. First, the portable terminal 200 determines whether or not the communication apparatus 100 that comes close is a wireless LAN mounted apparatus (S1101). In this case, the portable terminal 200 simply determines from apparatus article number information included in the apparatus information 420 received in S1005 whether or not the communication apparatus 100 is the wireless LAN mounted apparatus. That is, the portable terminal 200 simply previously stores a table, in which apparatus article number information is associated with information as to whether or not a wireless LAN is mounted, and determines in reference to this table whether or not the communication apparatus 100 is the wireless LAN mounted apparatus. Alternatively, the portable terminal 200 may notify an external server of the apparatus article number information, and inquire the external server whether or not the relevant communication apparatus 100 is the wireless LAN mounted apparatus.

In a case where the relevant communication apparatus 100 is not the wireless LAN mounted apparatus (NO in S1101), the portable terminal 200 cannot communicate with the communication apparatus 100 by the wireless LAN, and therefore the process is terminated. The process of S1101 may be omitted.

On the other hand, in a case where the relevant communication apparatus 100 is the wireless LAN mounted apparatus (YES in S1101), the portable terminal 200 transmits an operation command for activating the communication apparatus 100 in the master unit mode, to the proximity communication unit 120 (S1102). Herein, the transmitted operation command includes, for example, communication mode information for setting the high-speed wireless communication unit 130 to the master unit mode, and operation mode information for setting a digital camera, which is the communication apparatus 100, to the operation mode. The operation mode of the digital camera includes, for example, a photographing mode for photographing an object, a playback mode for reproducing a photographed image that is stored, an initial setting mode for performing the initial setting of the digital camera, and the like.

The proximity communication unit 120 receives the operation command, and writes the received operation command in the proximity wireless memory 121 (S1121). In this case, the proximity wireless communication unit 122 writes communication mode information and operation mode information included in the received operation command, in the area of the operation command shown in FIG. 8.

The portable terminal 200 transmits an activation signal for activating the communication apparatus 100 to the proximity communication unit 120 (S1103). Then, the proximity communication unit 120 receives the activation signal (S1122).

The proximity communication unit 120 outputs an interrupt to the system unit 110 (S1123). Then, the system unit 110 acquires the interrupt (S1141), and starts activation (S1142). Specifically, when acquiring the interrupt from the proximity communication unit 120, the control unit 111 gives an instruction of activation to the main power supply unit 112, and starts the readout of firmware by power supplied from the main power supply unit 112.

When the readout of the firmware is completed, and the activation of the system unit 110 is completed (S1143), the control unit 111 outputs a readout request of the operation command to the proximity communication unit 120 (S1144).

When the proximity communication unit 120 acquires the readout request (S1124), the operation command is output to the system unit 110 (S1125). The system unit 110 acquires the operation command (S1145), and activates the high-speed wireless communication unit 130 in the master unit mode, in accordance with the operation command (S1146). In this case, the operation command includes communication mode information indicating that the high-speed wireless communication unit 130 is set to the master unit mode, and therefore the control unit 111 sets the high-speed wireless communication unit 130 to the master unit mode.

When the operation mode information included in the operation command indicates the photographing mode, the control unit 111 executes the firmware of the photographing mode, and activates the communication apparatus 100 in the photographing mode. When the operation mode information indicates the playback mode, the firmware of the playback mode is executed, and the communication apparatus 100 is activated in the playback mode.

S1104 is the same as S309 in FIG. 4, and therefore description thereof will be omitted. The portable terminal 200 activates the high-speed wireless communication unit 230 (S1105), and is connected to the apparatus SSID (S1106). Consequently, the communication apparatus 100 serves as the master unit, and the portable terminal 200 serves as the slave unit, so that the communication connection between the communication apparatus 100 and the portable terminal 200 by the wireless LAN is established.

Figure 12:
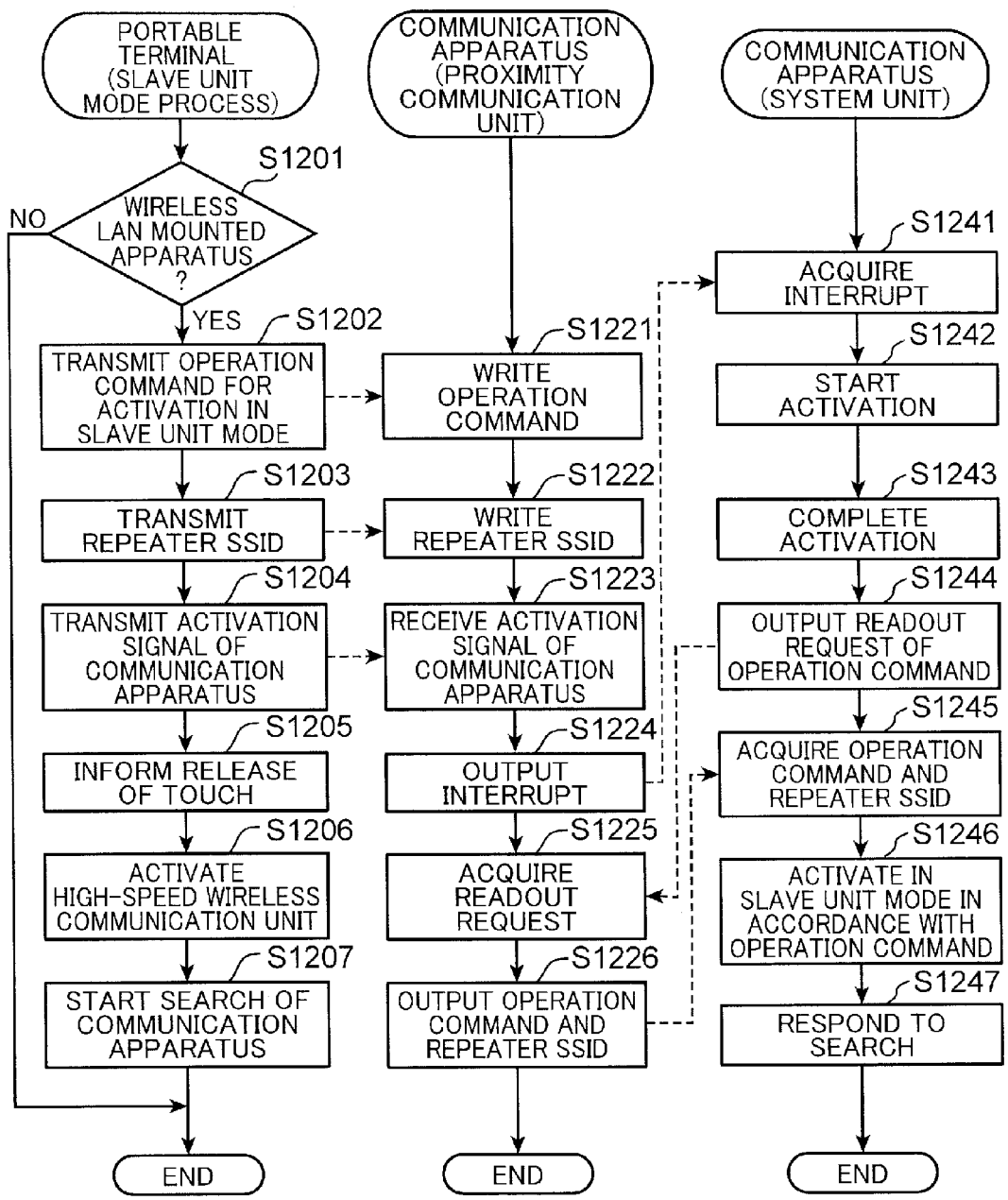
FIG. 12 is a sequence diagram showing the processes of the communication system performed when the terminal performs a slave unit mode process.

FIG. 12 is a sequence diagram showing the processes of the communication system performed when the portable terminal 200 performs the slave unit mode process. S1201 is the same as S1101 in FIG. 11, and therefore description thereof will be omitted.

The portable terminal 200 transmits an operation command for activating the communication apparatus 100 in the slave unit mode, to the proximity communication unit 120 (S1202). Herein, the transmitted operation command includes, for example, communication mode information for setting the high-speed wireless communication unit 130 to the slave unit mode, and the aforementioned operation mode information. S1221 is the same as S1121 in FIG. 11, and therefore description thereof will be omitted.

The portable terminal 200 transmits a repeater SSID and a repeater connection password of the repeater 300 currently connected, to the proximity communication unit 120 (S1203). Then, the proximity communication unit 120 receives the repeater SSID and the repeater connection password, and writes the received repeater SSID and repeater connection password in the proximity wireless memory 121 (S1222). In this case, the repeater SSID and the repeater connection password are written in the area of the repeater information shown in FIG. 8.

S1204 and S1223 are the same as S1103 and S1122 in FIG. 11, and therefore description thereof will be omitted. Additionally, S1224 and S1225 are the same as S1123 and S1124 in FIG. 11, and therefore description thereof will be omitted. Furthermore, S1241, S1242, S1243 and S1244 are the same as S1141, S1142, S1143 and S1144 in FIG. 11, and therefore description thereof will be omitted.

In S1226, the proximity communication unit 120 outputs the operation command and the repeater SSID to the system unit 110 (S1226). When acquiring the operation command and the repeater SSID (S1245), the system unit 110 activates the high-speed wireless communication unit 130 in the slave unit mode, in accordance with the operation command (S1246). In this case, the operation command includes communication mode information indicating that the high-speed wireless communication unit 130 is set to the slave unit mode, and therefore the control unit 111 sets the high-speed wireless communication unit 130 to the slave unit mode. Specifically, the control unit 111 writes the repeater SSID and the repeater connection password in the communication information storage unit 133 via the communication control unit 131, so that the high-speed wireless communication unit 130 is set to the slave unit mode.

The control unit 111 sets the communication apparatus 100 to the photographing mode or the playback mode, in accordance with the operation mode information included in the operation command.

S1205 is the same as S309 in FIG. 4, and therefore description thereof will be omitted. The portable terminal 200 serves as the master unit to activate the high-speed wireless communication unit 230 (S1206), and starts the search of the communication apparatus 100 by the wireless LAN (S1207). Herein, the portable terminal 200 transmits M search, in which an MAC address included in the apparatus information 420 acquired in S1005 of FIG. 10 is a search target, to the repeater 300. The repeater 300, which receives this, transmits the M search to all the connected communication apparatuses.

In S1247, in a case where the MAC address included in the M search is the MAC address of the high-speed wireless communication unit 130, the system unit 110 transmits a response to the search to the portable terminal 200. Consequently, the communication apparatus 100 serves as the slave unit, and the portable terminal 200 serves as the master unit, so that the communication connection between the communication apparatus 100 and the portable terminal 200 by the wireless LAN is established.

Figure 13:
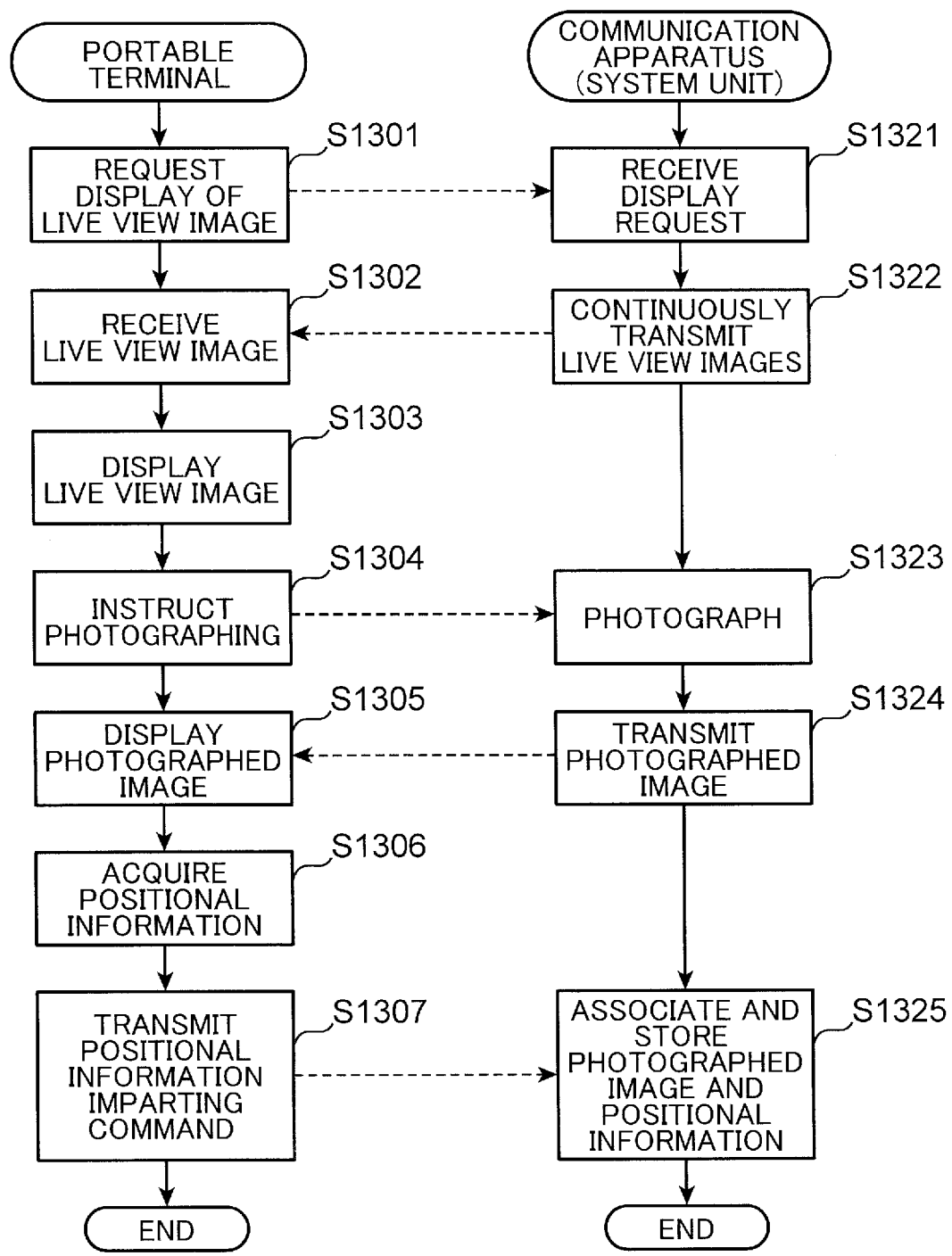
FIG. 13 is a sequence diagram showing the processes of the communication system performed after connection between the communication apparatus and the portable terminal by a wireless LAN is completed, in Embodiment 1 of the present invention.

FIG. 13 is a sequence diagram showing the processes of the communication system performed after the connection between the communication apparatus 100 and the portable terminal 200 by the wireless LAN is completed in Embodiment 1 of the present invention. FIG. 13 shows the process of a communication system performed in a case where the operation designation command is the photographing mode in FIG. 11 and FIG. 12.

First, the portable terminal 200 transmits a display request of a live view image to the communication apparatus 100 (S1301). Then, the high-speed wireless communication unit 130 of the communication apparatus 100 receives this display request (S1321). The communication apparatus 100 causes the imaging unit 113 to photograph an image of an object at a predetermined frame rate to acquire a live view image, and continuously transmits live view images to the portable terminal 200 via the high-speed wireless communication unit 130 (S1322). The portable terminal 200 receives the live view image via the high-speed wireless communication unit 230 (S1302). The control unit 211 of the portable terminal 200 causes the display unit 214 to display the live view image (S1303). Consequently, the user can determine photographing timing while seeing the live view image.

When the user presses a shutter button, the control unit 111 of the portable terminal 200 transmits a photographing instruction to the communication apparatus 100 via the high-speed wireless communication unit 130 (S1304). When the high-speed wireless communication unit 130 of the communication apparatus 100 receives the photographing instruction, the control unit 111 of the communication apparatus 100 causes the imaging unit 113 to photograph an object (S1323).

The high-speed wireless communication unit 130 of the communication apparatus 100 transmits an photographed image to the portable terminal 200 (S1324). When the high-speed wireless communication unit 230 of the portable terminal 200 receives the photographed image, the control unit 211 of the portable terminal 200 causes the display unit 214 to display the photographed image (S1305).

The control unit 211 of the portable terminal 200 acquires positional information (S1306), and transmits a positional information imparting command for associating and storing the photographed image and the positional information, to the communication apparatus 100 via the high-speed wireless communication unit 230 (S1307). As the positional information, for example, information acquired by a GPS sensor that is provided in the portable terminal 200 may be employed. Then, the high-speed wireless communication unit 230 of the communication apparatus 100 receives the positional information imparting command, and the control unit 111 of the communication apparatus 100 associates and stores the photographed image and the positional information included in the positional information imparting command, in the image memory 115 (S1325).

Thus, according to this embodiment, when the portable terminal 200 writes the operation command indicating the master unit mode or the slave unit mode, in the proximity wireless memory 121 of the communication apparatus 100 by using proximity wireless communication, and transmits an activation signal, the communication connection between the communication apparatus 100 and the portable terminal 200 by the wireless LAN is established without using the proximity wireless communication. Therefore, it is not necessary for the user to bring the portable terminal 200 close to (into touch with) the communication apparatus 100 until the communication connection between the communication apparatus 100 and the portable terminal 200 by the wireless LAN is established. As a result, a period during the portable terminal 200 is brought close to the communication apparatus 100 is shortened, and the user can activate the communication apparatus 100 by bringing the portable terminal 200 close to the communication apparatus 100 a small number of times (once in a case where the number of times is small) (one touch).

In a case where the portable terminal 200 is not connected to the repeater 300, the communication mode information indicating the master unit mode as the operation command is written in the proximity wireless memory 121 by using the proximity wireless communication. In a case where the portable terminal 200 is connected to the repeater 300, the communication mode information indicating the slave unit mode as the operation command is written in the proximity wireless memory 121 by using the proximity wireless communication. Therefore, it is possible to perform communication between the communication apparatus 100 and the portable terminal 200 in a suitable communication mode for the wireless LAN, in accordance with the communication status of the portable terminal 200.

In the description described above, the operation command that explicitly indicates the master unit mode or the slave unit mode is employed as the communication mode information. However, the communication mode information is not limited to this. For example, the process of writing the repeater SSID in the proximity wireless memory 121 is performed in S1222 of FIG. 12, and the communication apparatus 100 may be activated in the slave unit mode, when the repeater SSID is written in the proximity wireless memory 121 by this process, while the communication apparatus 100 may be activated in the master unit mode, when the repeater SSID is not written in the proximity wireless memory 121. In this case, the repeater SSID corresponds to the operation command indicating the communication mode information. Therefore, in this case, the communication mode information may be excluded from the operation command.

Although FIG. 13 shows the process performed in a case where the photographing mode is designated by the operation mode information, this is merely one example. In a case where a playback mode or an initial setting mode is designated as the operation mode information, it is only necessary to perform a process according to these modes.

In a case where an apparatus other than the digital camera is employed as the communication apparatus 100, the communication system simply perform a process according to an operation mode designated with respect to the apparatus by the operation mode information. For example, in a case where a Blu-ray recorder is employed as the apparatus, the operation mode includes a playback mode, and a recording mode, and therefore, the user operates the portable terminal 200 to designate these operation modes as the operation mode information. Then, the communication system simply performs a process of an operation mode designated by the operation mode information.

(Embodiment 3)

Figure 14:
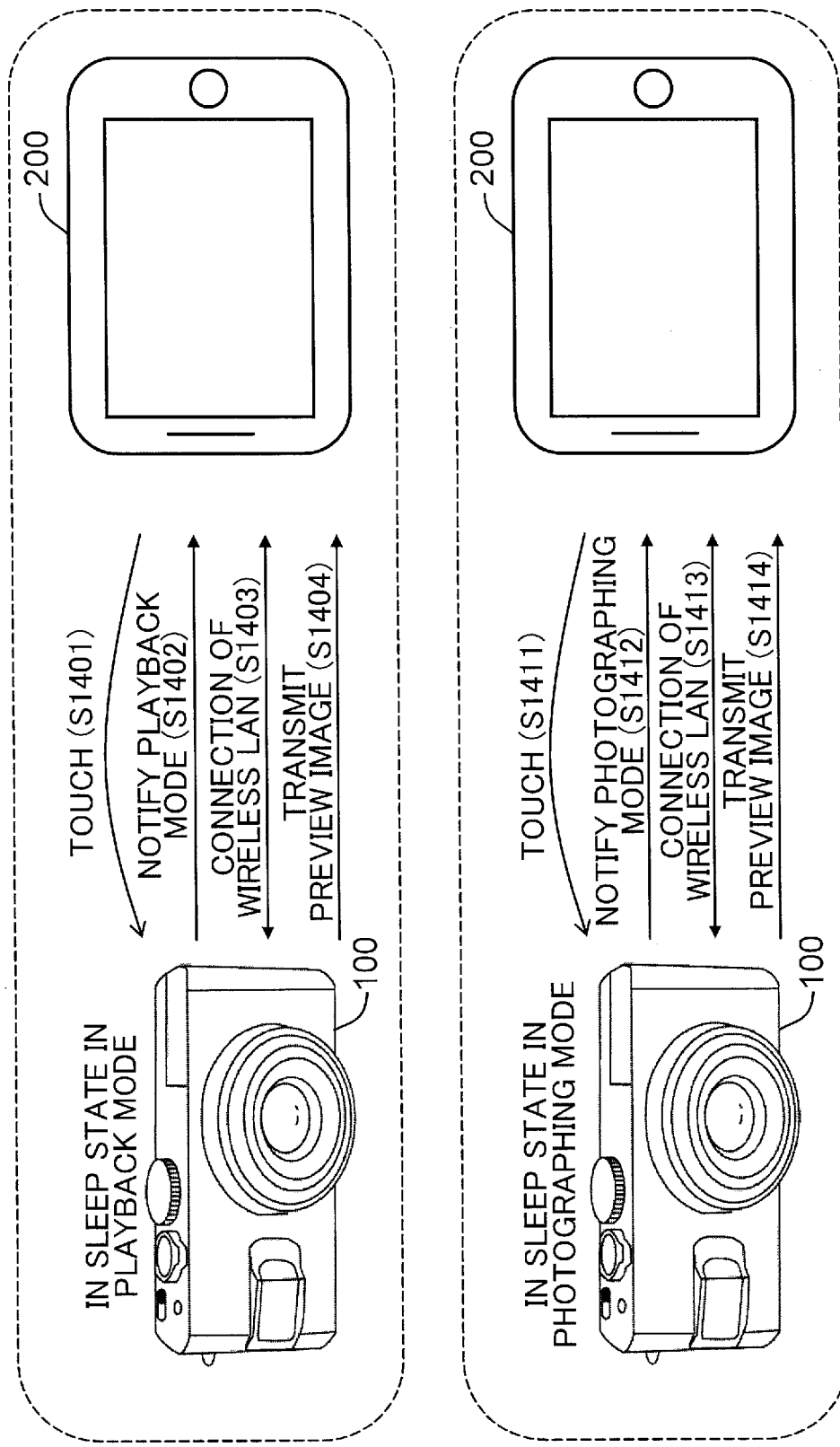
FIG. 14 is a diagram for illustrating the outline of operation of a communication system according to Embodiment 3 of the present invention.

FIG. 14 is a diagram illustrating the outline of operation of a communication system according to Embodiment 3 of the present invention. In this embodiment, components identical to those of Embodiments 1 and 2 are denoted by the same reference numerals, and description thereof will be omitted. In Embodiment 2, the operation command includes the operation mode information, and the communication apparatus 100 is activated in the operation mode indicated by the operation mode information.

In Embodiment 3, a communication apparatus 100 writes state information indicating its own current operation mode, as an operation command in a proximity wireless memory 121, just before entering a sleep state. When receiving an activation signal from a portable terminal 200, the communication apparatus 100 is activated in accordance with the state information written in the proximity wireless memory 121. In this embodiment, a digital camera is employed as the communication apparatus 100. However, this is merely an example, and other apparatus may be employed.

As shown in FIG. 14, in a case where the communication apparatus 100 transits to a sleep state in a playback mode, when the portable terminal 200 is brought close to (into tough with) the communication apparatus 100 (S1401), the communication apparatus 100 reads out the state information from the proximity wireless memory 121, and notifies the portable terminal 200 of the state information indicating the playback mode (S1402). Then, communication connection between the communication apparatus 100 and the portable terminal 200 by a wireless LAN is established (S1403). The communication apparatus 100 sets the operation mode to the playback mode to be activated, and transmits a preview image displayed on a display unit 114 to the portable terminal 200 (S1404).

On the other hand, in a case where the communication apparatus 100 transits to a sleep state in a photographing mode, when the portable terminal 200 is brought close to (into tough with) the communication apparatus 100 (S1411), the communication apparatus 100 reads out the state information from the proximity wireless memory 121, and notifies the portable terminal 200 of the state information indicating the photographing mode (S1413). Then, the communication connection between the communication apparatus 100 and the portable terminal 200 by the wireless LAN is established (S1413). The communication apparatus 100 sets the operation mode to the photographing mode to be activated, and transmits the live view image photographed by an imaging unit 113 to the portable terminal 200 (S1414).

Figure 15:
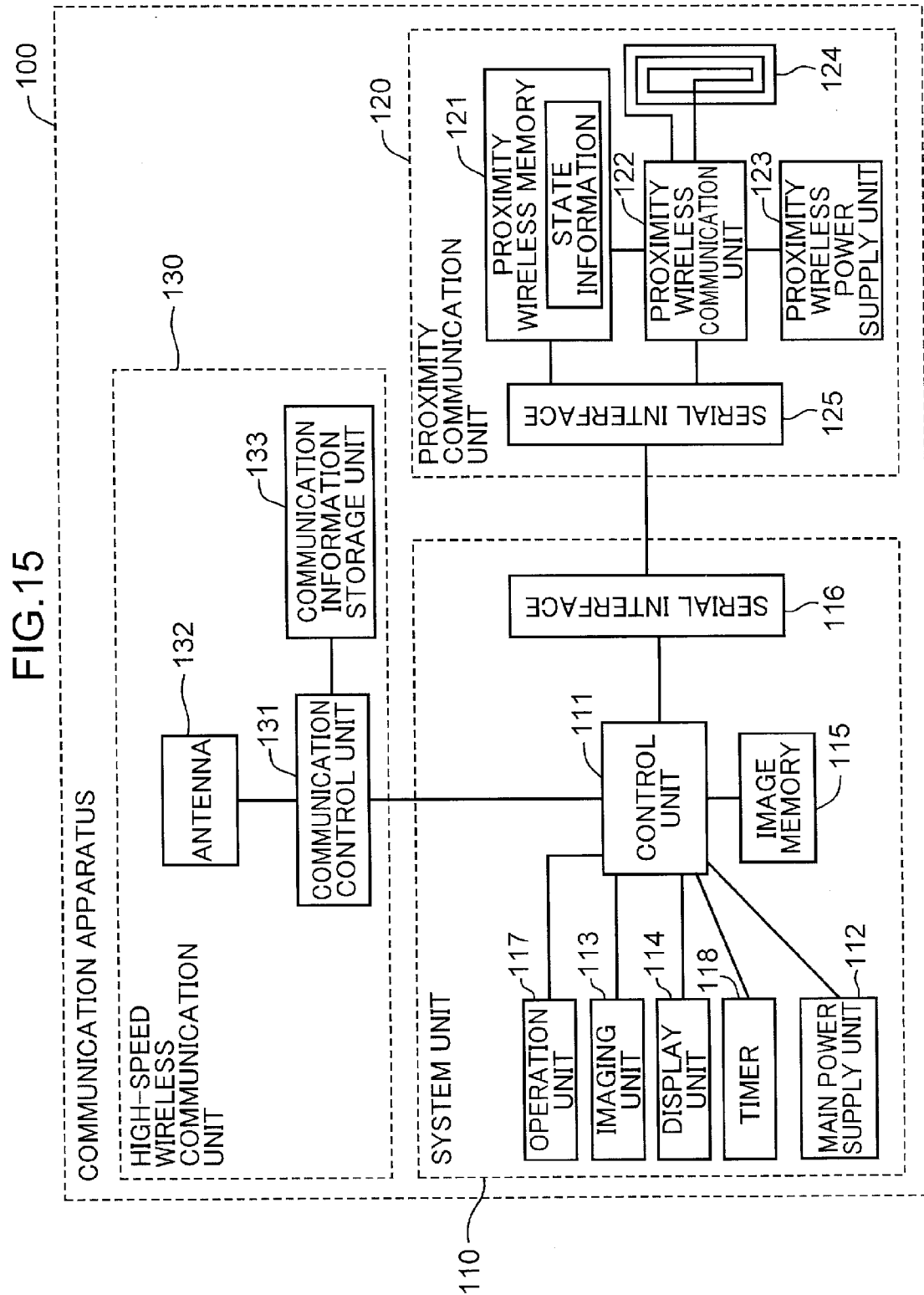
FIG. 15 is a block diagram of a communication apparatus that is applied to the communication system according to Embodiment 3 of the present invention.

FIG. 15 is a block diagram of the communication apparatus 100 that is applied to the communication system according to Embodiment 3 of the present invention. FIG. 15 is different from FIG. 6 in that a system unit 110 further includes a timer 118, and state information is written in the proximity wireless memory 121.

The timer 118 counts a period during which a user does not operate. When the operation of the user to an operation unit 117 is finished, a control unit 111 causes the timer 118 to start clocking operation. Then, when clocking time by the timer 118 is a threshold value or more, the communication apparatus 100 is caused to transit to the sleep state. Herein, the sleep state indicates a state where the main power supply unit 112 is set to a power saving mode. In the power saving mode, the main power supply unit 112 supplies minimum power. The example of the minimum power supply includes, for example, power supply allowing the control unit 111 to instruct the main power supply unit 112 to return from the power saving mode to a normal mode when the proximity communication unit 120 receives the activation signal from the portable terminal 200.

The proximity wireless memory 121 stores the state information. The state information is information written by the control unit 111 just before the communication apparatus 100 transits to the sleep state. In the photographing mode, in a case where the communication apparatus 100 transits to the sleep state, the control unit 111 writes state information indicating the photographing mode in the proximity wireless memory 121. In the playback mode, in a case where the communication apparatus 100 transits to the sleep state, the control unit 111 writes state information indicating the playback mode in the proximity wireless memory 121. Thus, the control unit 111 writes the operation mode of the communication apparatus 100 at the time of the transition to the sleep state, as the state information in the proximity wireless memory 121.

Figure 16:
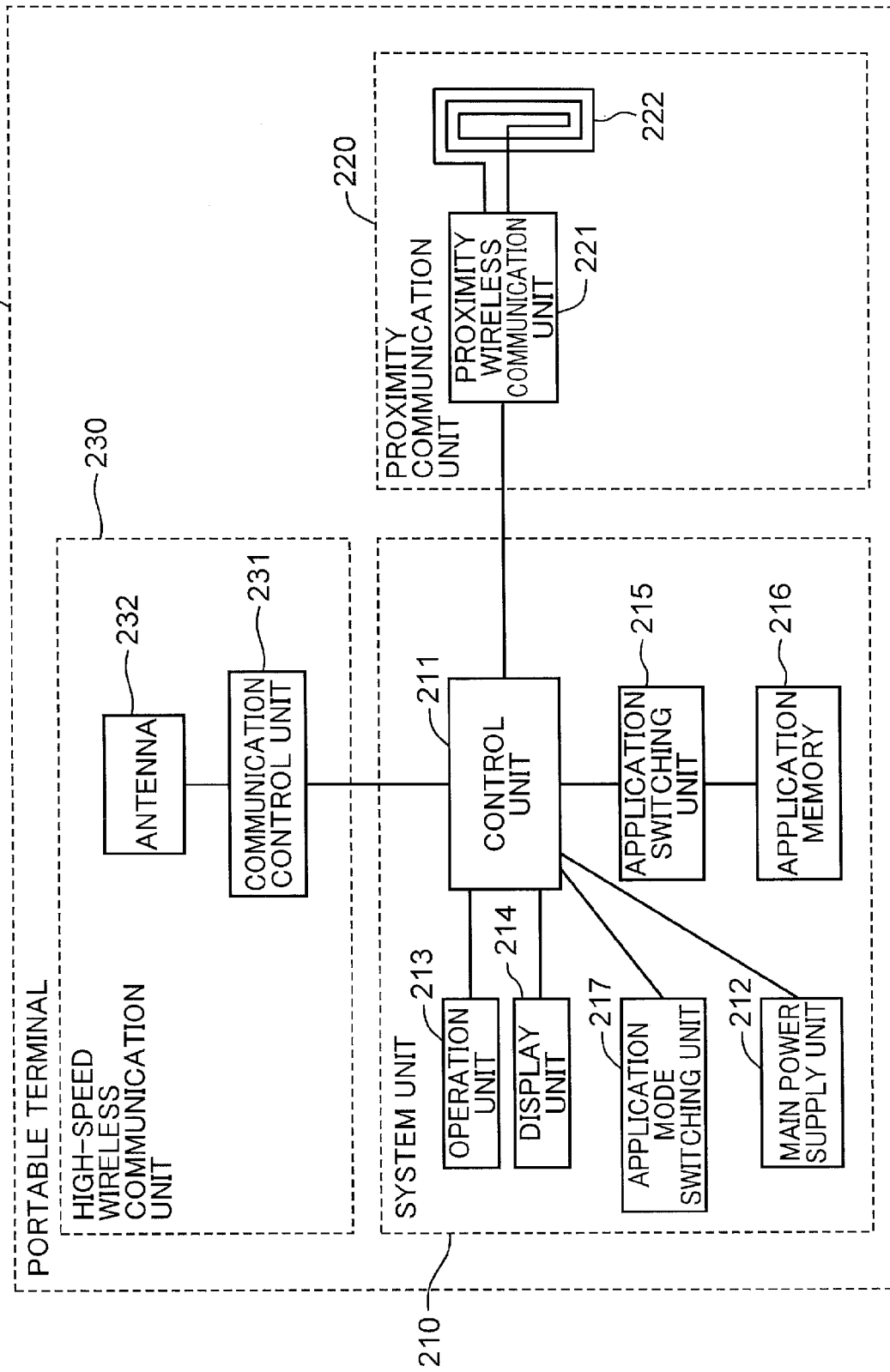
FIG. 16 is a block diagram of a portable terminal that is applied to the communication system according to Embodiment 3 of the present invention.

FIG. 16 is a block diagram of the portable terminal 200 that is applied to the communication system according to Embodiment 3 of the present invention. FIG. 16 is different from FIG. 7 in that a system unit 210 further includes an application mode switching unit 217.

In a case where the state information stored in the proximity wireless memory 121 indicates the photographing mode in a state where the control unit 211 executes the application software of the digital camera, the application mode switching unit 217 causes the control unit 211 to execute application software corresponding to the photographing mode. In a state where the control unit 211 executes the application software of the digital camera, in a case where the state information stored in the proximity wireless memory 121 indicates the playback mode, the application mode switching unit 217 causes the control unit 211 to execute application software for the portable terminal 200 corresponding to the playback mode. Thus, the application mode switching unit 217 causes the control unit 211 to execute the application software for the portable terminal 200 corresponding to the operation mode indicating the state information stored in the proximity wireless memory 121.

Figure 17:
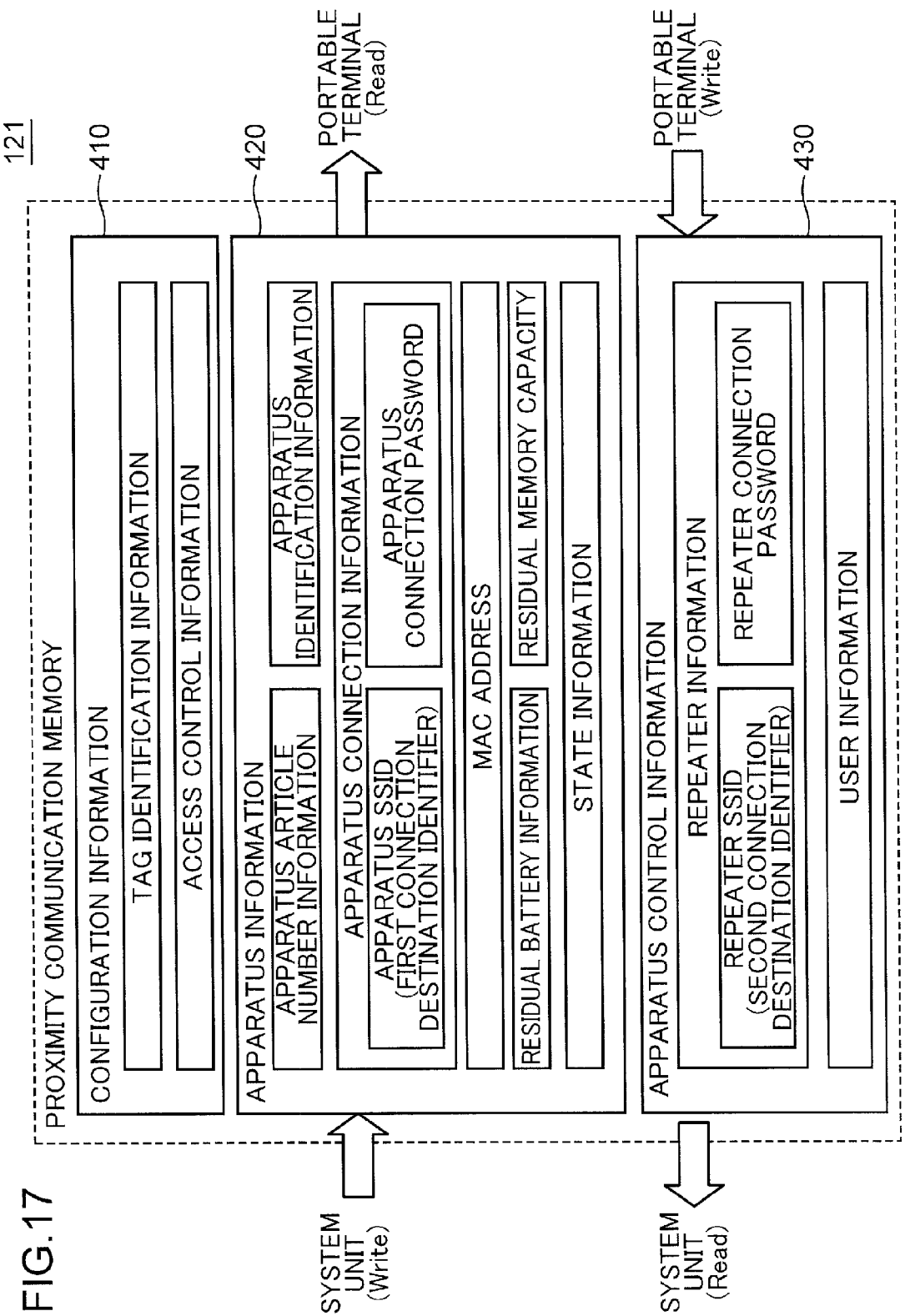
FIG. 17 is a configuration diagram of data stored by a proximity wireless memory, in Embodiment 3 of the present invention.

FIG. 17 is a configuration diagram of data stored by the proximity wireless memory 121, in Embodiment 3 of the present invention. FIG. 17 is different from FIG. 8 in that apparatus information 420 further includes state information, and an operation command are excluded from apparatus control information 430.

The state information includes a power supply state, and detailed information in addition to the aforementioned operation mode information. The power supply state indicates whether the communication apparatus is in an ON state or in an OFF state. As the detailed information, for example, information on the resolution, the exposure time, and the white balance of the imaging unit 113 are employed.

Figure 18:
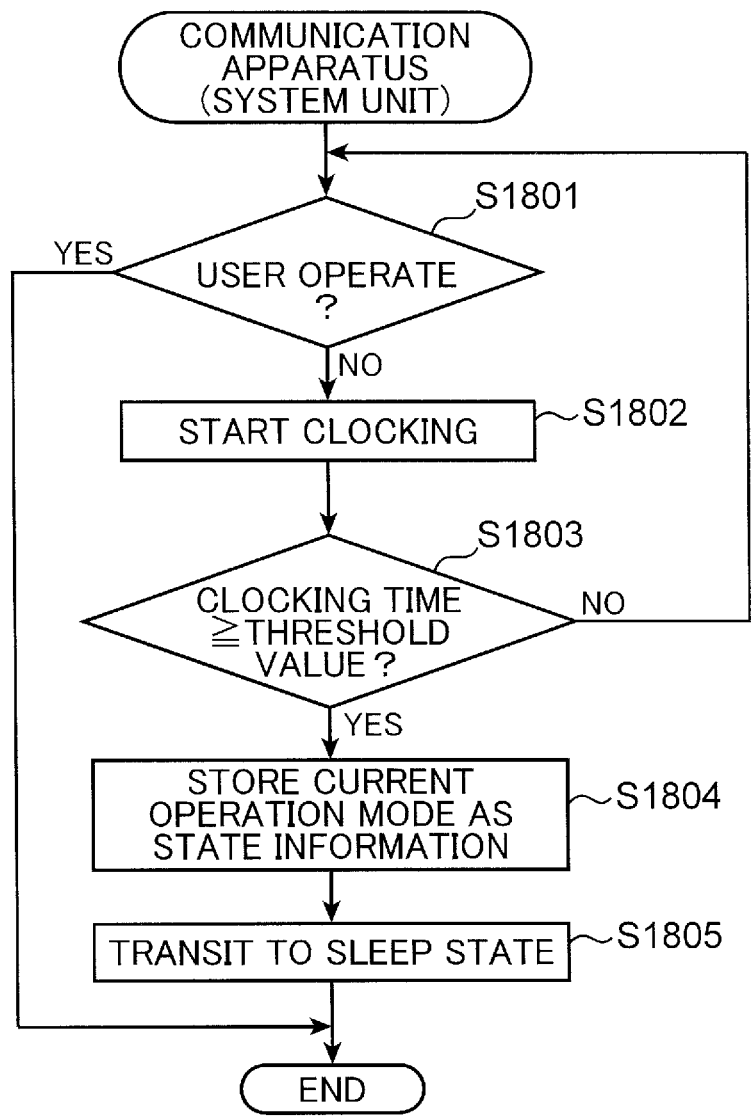
FIG. 18 is a flowchart showing processes performed when the communication apparatus transits to a sleep state, in Embodiment 3 of the present invention.

FIG. 18 is a flowchart showing processes performed when the communication apparatus 100 transits to the sleep state, in Embodiment 3 of the present invention. First, the control unit 111 determines whether or not the user operates the operation unit 117 (S1801). When determining that the user does not operate the operation unit 117 (NO in S1801), the control unit 111 resets the timer 118, and causes the timer 118 to start clocking (S1802). On the other hand, when determining the user operates the operation unit 117 (YES in S1801), the process is terminated. In S1803, in a case where the clocking time of the timer 118 is less than a threshold value (NO in S1803), the control unit 111 returns the process to S1801.

On the other hand, in a case where the clocking time of the timer 118 is a threshold value or more (YES in S1803), the control unit 111 stores the current operation mode as the state information in the proximity wireless memory 121 (S1804). Then, the control unit 111 sets the main power supply unit 112 to the power saving mode, and causes the communication apparatus 100 to transit to the sleep state (S1805).

Thus, the control unit 111 monitors whether or not the user operates the operation unit 117, and transits the communication apparatus 100 to the sleep state when determining that the user does not operate the operation unit 117 for a certain period of time or more.

Figure 19:
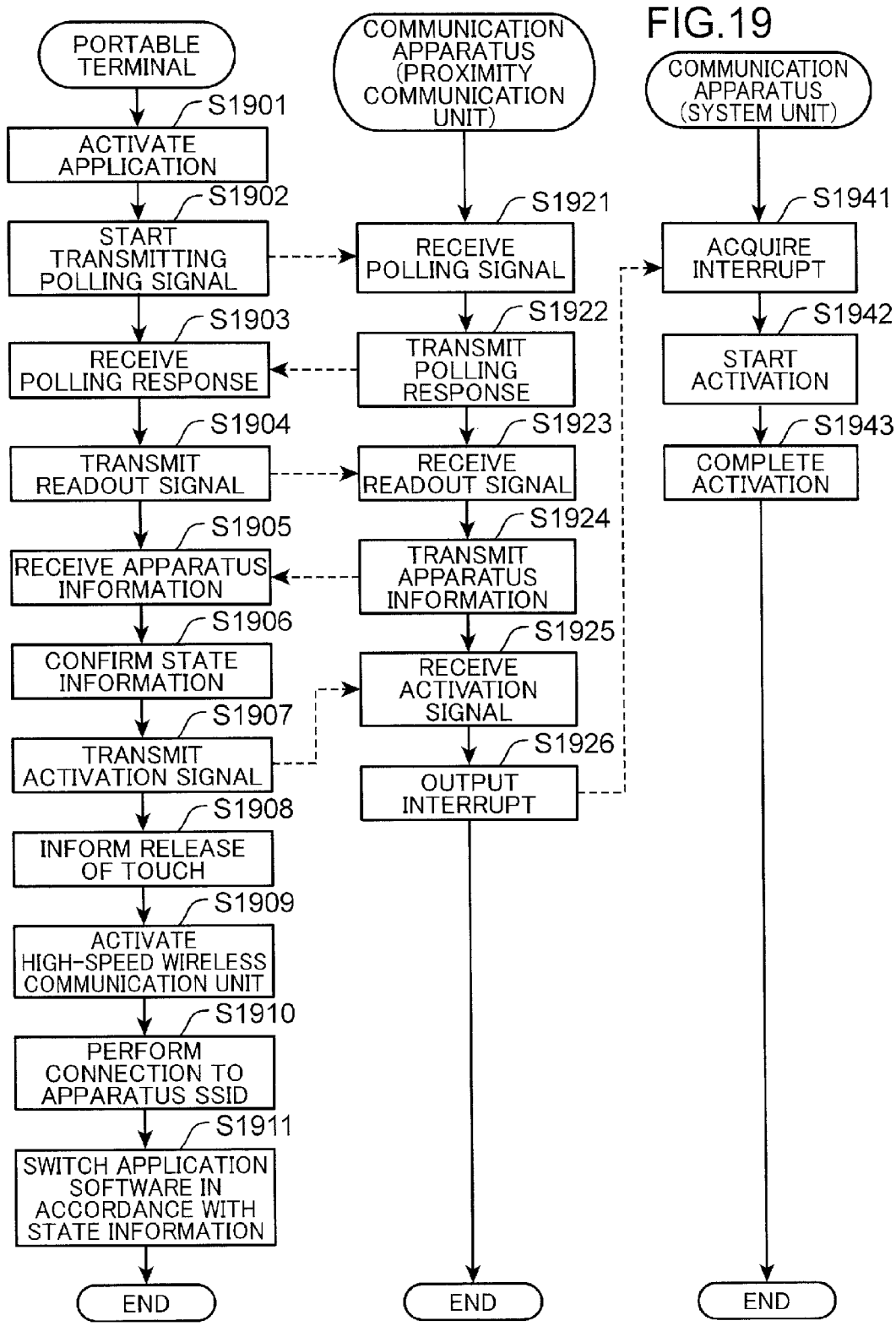
FIG. 19 is a sequence diagram showing operation of the communication system of Embodiment 3 of the present invention.

FIG. 19 is a sequence diagram showing operation of the communication system of Embodiment 3 of the present invention. S1901, S1902, S1903, S1904 and S1905 are the same as S301, S303, S304, S305 and S306, and description thereof will be omitted. S1921, S1922, S1923 and S1924 are the same as S321, S322, S323 and S324 in FIG. 3, and description thereof will be omitted.

In S1906, the portable terminal 200 confirms state information included in received apparatus information 420. Specifically, the control unit 211 acquires the apparatus information 420 received by the proximity wireless communication unit 221 from the proximity wireless communication unit 221, and confirms state information included in the acquired apparatus information 420.

The portable terminal 200 transmits an activation signal to the communication apparatus 100 (S1907). Specifically, the control unit 211 instructs the proximity wireless communication unit 221 to transmit the activation signal, and causes the proximity wireless communication unit 221 to transmit the activation signal via the antenna 222.

The proximity communication unit 120 of the communication apparatus 100 receives the activation signal (S1925). Specifically, the proximity wireless communication unit 122 receives the activation signal via an antenna 124.

The proximity communication unit 120 outputs an interrupt to the system unit 110 (S1926). The system unit 110 acquires the interrupt (S1941). Then, the system unit 110 reads out the state information from the proximity wireless memory 121, activates the communication apparatus 100 in an operation mode indicated by the state information (S1942), and completes the activation (S1943).

S1908, S1909 and S1910 are the same as S1104, S1105 and S1106 in FIG. 11, and description thereof will be omitted. By S1910, the communication apparatus 100 serves as a master unit, and the portable terminal 200 serves as a slave unit, so that communication connection between the communication apparatus 100 and the portable terminal 200 by the wireless LAN is established. Then, the portable terminal 200 switches to the application software for portable terminal 200 corresponding to the operation mode indicated by the state information confirmed in S1906 (S1911). Specifically, when the state information indicates the photographing mode, the application mode switching unit 217 causes the control unit 211 to execute application software for the portable terminal 200 corresponding to the photographing mode. Additionally, when the state information indicates the playback mode, the application mode switching unit 217 causes the control unit 211 to execute application software for the portable terminal 200 corresponding to the playback mode.

Thus, in this embodiment, the communication apparatus 100 writes the state information indicating the current operation mode in the proximity wireless memory 121, before transiting to the sleep state, and then transits to the sleep state. Then, the portable terminal 200 causes the control unit 211 to execute the application software according to the operation mode indicated by the state information written in the proximity wireless memory 121, when the communication apparatus 100 returns from the sleep state to the activation state. Additionally, the communication apparatus 100 is also activated in an operation mode indicated by the state information.

Therefore, when returning the communication apparatus 100 from the sleep state to the activation state, the user can return the communication apparatus 100 in an operation mode before the transition to the sleep state, without performing operation for designating an operation mode by using the portable terminal 200 again.

(Embodiment 4)

Figure 20:
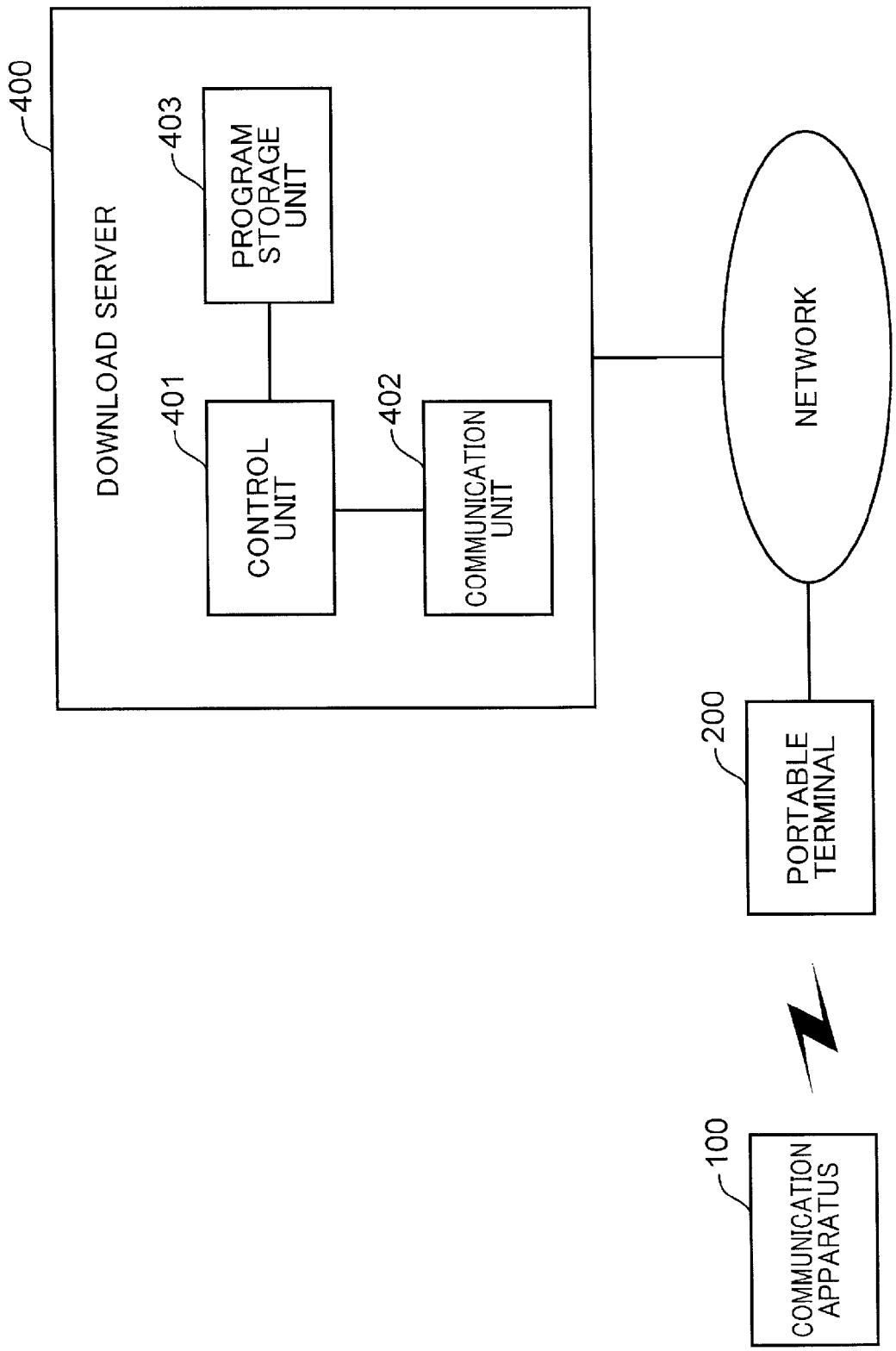
FIG. 20 is an entire configuration diagram of a communication system according to Embodiment 4 of the present invention.

FIG. 20 is an entire configuration diagram of a communication system according to Embodiment 4 of the present invention. The communication system of Embodiment 4 is provided with a download server 400 that transmits application software for a portable terminal 200 applied to the communication systems shown in Embodiments 1 to 3.

The download server 400 is connected to the portable terminal 200 via a network, and transmits application software to the portable terminal 200. Specifically, the download server 400 includes a control unit 401, a communication unit 402, and a program storage unit 403. The control unit 401 is configured by, for example, a CPU, a ROM, a RAM, and the like. The communication unit 402 is configured by, for example, a communication module corresponding to the communication standard of the network. The program storage unit 403 is configured, for example, a storage apparatus such as a hard disk drive, and stores the application software for the portable terminal 200.

As the communication apparatus 100 and the portable terminal 200, the communication apparatus and the portable terminal described in Embodiment 1 to 3 are employed. That is, the communication apparatus 100 and the portable terminal 200 are communicably configured by both a wireless LAN and proximity wireless communication. As the network, Internet is employed, and various data is transmitted/received in accordance with the communication standard of TCP/IP.

When the communication unit 402 receives a download request of the application software from the portable terminal 200, the control unit 401 reads out application software indicated by the download request from program storage unit 403, and delivers the application software to the communication unit 402. Then, the communication unit 402 transmits the application software delivered from the control unit 401, to the portable terminal 200 that receives the download request.

Herein, the download server 400 causes the portable terminal 200 to access, for example, a WEB page for providing a user with download service. Then, the user only needs to select a household electrical appliance that configures the communication apparatus 100 on the WEB page, and application software for the portable terminal 200 corresponding to the selected household electrical appliance is simply transmitted to the portable terminal 200.

Thus, according to this embodiment, the download server 400 is provided, and therefore the user that possesses the portable terminal 200 can easily obtain application software.

In the description described above, the download server 400 transmits the application software for the portable terminal 200. However, the present invention is not limited to this, and the download server 400 may also transmit application software for the communication apparatus 100. In this case, the program storage unit 403 only needs to store the application software for the communication apparatus 100 for causing a computer to function as the communication apparatus 100 described in Embodiments 1 to 3. In a case where a download request of the application software for the communication apparatus 100 is received from the portable terminal 200, the download server 400 simply reads out the relevant application software from the program storage unit 403, to transmit the relevant application software to the communication apparatus 100 via the portable terminal 200. Alternatively, in a case where the communication apparatus 100 can be directly connected to the network, the relevant application software is simply transmitted to the communication apparatus 100 in accordance with a download request from the communication apparatus 100.

Furthermore, application software capable of causing a computer to function as the communication apparatus 100 and the portable terminal 200 may be recorded in, for example, a computer readable storage medium such as a DVD-ROM, to be distributed.

(Summary of Embodiments)

(1) A communication apparatus according to an aspect of the present invention is a communication apparatus configured to be communicable with a portable terminal, and includes: a proximity wireless power supply unit that is activated by radio waves of proximity wireless communication transmitted from the portable terminal; a non-volatile memory that is driven by power supplied from the proximity wireless power supply unit, and stores an operation command of the communication apparatus; a proximity wireless communication unit that is driven by the power supplied from the proximity wireless power supply unit, and performs proximity wireless communication with the portable terminal; a main power supply unit that is activated on the basis of a signal received by the proximity wireless communication unit; and a control unit that is driven by power supplied from the main power supply unit, and reads out the operation command from the non-volatile memory to execute the operation command, wherein the proximity wireless communication unit writes the operation command transmitted from the portable terminal, in the non-volatile memory.

According to this configuration, when the radio waves of the proximity wireless communication are transmitted from the portable terminal, the proximity wireless power supply unit is activated, and the proximity wireless communication unit is driven by the power from the proximity wireless power supply unit, and the operation command transmitted from the portable terminal is written in the proximity wireless memory. Therefore, even when the communication apparatus is in a sleep state or an OFF state, the user can write the operation command in the communication apparatus by operating the portable terminal.

Then, when the signal is received by the proximity wireless communication unit, the main power supply unit is activated, and the communication apparatus is operated in accordance with the operation command. Consequently, the user can operate the communication apparatus simply by inputting the operation command in the portable terminal, and holding the portable terminal up over the proximity communication unit of the communication apparatus (bringing the portable terminal into one touch with the proximity communication unit of the communication apparatus) once.

(2) The communication apparatus may further include a high-speed wireless communication unit that communicates with the portable terminal by using high-speed wireless communication with higher speed than the proximity wireless communication, wherein the high-speed wireless communication unit may be operable in a communication mode of either a master unit mode in which the communication apparatus accepts connection from the portable terminal that serves as a slave unit, or a slave unit mode in which the communication apparatus is connected to the portable terminal that serves as a master unit, and the control unit may determine, on the basis of the operation command written in the non-volatile memory, whether the high-speed wireless communication unit is operated in the master unit mode or in the slave unit mode.

According to this configuration, the control unit can causes the communication apparatus to operate in the master unit mode or the slave unit mode, in accordance with the operation command written in the non-volatile memory.

(3) The control unit preferably previously writes, in the non-volatile memory, a first connection destination identifier used in a case where the communication apparatus is operated in the master unit mode.

According to this configuration, the first connection destination identifier used in the case where the communication apparatus is operated in the master unit mode is previously written in the non-volatile memory. Herein, the non-volatile memory can be activated by receiving the power supplied from the proximity wireless power supply unit, even when the non-volatile memory does not receive the power supplied from the main power supply unit. Therefore, when the proximity wireless communication unit receives a signal from the portable terminal, the first connection destination identifier can be transmitted to the portable terminal without waiting for the activation of the main power supply unit.

(4) In a case where the portable terminal is not connected to a repeater of the high-speed wireless communication, the proximity wireless communication unit may receive an operation command including communication mode information indicating the master unit mode from the portable terminal, and write the operation command in the non-volatile memory, while in a case where the portable terminal is connected to the repeater, the proximity wireless communication unit may receive an operation command including communication mode information indicating the slave unit mode from the portable terminal, and write the operation command in the non-volatile memory, and the control unit may cause the high-speed wireless communication unit to operate in the master unit mode in a case where the communication mode information indicates the master unit mode, while the control unit may cause the high-speed wireless communication unit to operate in the slave unit mode in a case where the communication mode information indicates the slave unit mode.

According to this configuration, in the case where the portable terminal is not connected to the repeater of the high-speed wireless communication, the communication mode information indicating the master unit mode is transmitted from the portable terminal by the proximity wireless communication, and written in the non-volatile memory. On the other hand, in the case where the portable terminal is connected to the repeater, the communication mode information indicating the slave unit mode is transmitted from the portable terminal by the proximity wireless communication, and written in the non-volatile memory. Therefore, the control unit can determine the communication mode in accordance with the communication mode information, and operate the high-speed wireless communication unit in a suitable communication mode.

(5) In a case where the portable terminal is connected to a repeater of the high-speed wireless communication, the proximity wireless communication unit may receive a second connection destination identifier whose connection destination is the repeater, from the portable terminal, and write the second connection destination identifier as the operation command in the non-volatile memory, and the control unit may cause the high-speed wireless communication unit to operate in the master unit mode in a case where the second connection destination identifier is not written in the non-volatile memory, while the control unit may cause the high-speed wireless communication unit to operate in the slave unit mode in a case where the second connection destination identifier is written in the non-volatile memory.

According to this configuration, the control unit can determine whether the high-speed wireless communication unit is operated in the master unit mode or the slave unit mode by determination as to whether or not the second connection destination identifier is written in the non-volatile memory, and the high-speed wireless communication unit can be operated in a suitable communication mode.

(6) The control unit may read out the operation command from the non-volatile memory and switch the communication mode of the high-speed wireless communication unit, after the main power supply unit is activated.

According to this configuration, the control unit can receive power supply from the main power supply unit to execute the operation command and to switch the communication mode, thereby enabling the suppression of the wasteful consumption of power supply for backup.

(7) The proximity wireless communication unit may write the operation command in the non-volatile memory, before the main power supply unit is activated, and the control unit may read out the operation command from the non-volatile memory, after the main power supply unit is activated.

According to this configuration, the portable terminal can write the operation command in the non-volatile memory without waiting the activation of the communication apparatus upon receipt of power supply from the main power supply unit, and the input period of the operation command can be shortened.

(8) A communication system according to another aspect of the present invention is a communication system that includes: a portable terminal; and a communication apparatus configured to be communicable with the portable terminal, wherein the portable terminal includes: a proximity wireless power supply unit that is activated by radio waves of proximity wireless communication transmitted from the portable terminal; a non-volatile memory that is driven by power supplied from the proximity wireless power supply unit, and stores an operation command of the communication apparatus; a proximity wireless communication unit that is driven by the power supplied from the proximity wireless power supply unit, and performs proximity wireless communication with the portable terminal; a main power supply unit that is activated on the basis of a signal received by the proximity wireless communication unit; and a control unit that is driven by power supplied from the main power supply unit, and reads out the operation command from the non-volatile memory to execute the operation command, and wherein the proximity wireless communication unit writes the operation command transmitted from the portable terminal, in the non-volatile memory.

According to this configuration, the user can operate the communication apparatus simply by inputting the operation command in the portable terminal, and holding the portable terminal up over the proximity communication unit of the communication apparatus once.

(9) A portable terminal according to another aspect of the present invention is a portable terminal configured to be communicable with a communication apparatus, and includes: a proximity wireless communication unit that performs proximity wireless communication with the communication apparatus; a high-speed wireless communication unit that performs high-speed wireless communication with higher speed than the proximity wireless communication; and a control unit that transmits an operation command indicating a slave unit mode in which the communication apparatus is connected to the portable terminal that serves as a master unit, to the communication apparatus via the proximity wireless communication unit, and writes the operation command in a non-volatile memory provided in the communication apparatus, in a case where the portable terminal is connected to a repeater of the high-speed wireless communication.

According to this configuration, in the case where the portable terminal is connected to the repeater, the operation command indicating the slave unit mode is transmitted by the proximity wireless communication unit. Therefore, the communication apparatus serves as a slave unit and is connected to the repeater, so that the communication apparatus and the portable terminal can establish high-speed wireless communication connection in the slave unit mode.

(10) A portable terminal according to another aspect of the present invention is a portable terminal configured to be communicable with a communication apparatus, and includes: a proximity wireless communication unit that performs proximity wireless communication with the communication apparatus; a high-speed wireless communication unit that performs high-speed wireless communication with higher speed than the proximity wireless communication; a control unit that reads out, via the proximity wireless communication unit, state information indicating a state of the communication apparatus and stored as an operation command in a non-volatile memory of the communication apparatus; and an application mode switching unit that causes the control unit to execute application software to be executed in cooperation with the communication apparatus by using the high-speed wireless communication, on the basis of the state information read out from the control unit.

According to this configuration, the portable terminal reads out, via the proximity wireless communication unit, the state info nation of the communication apparatus stored as the operation command in the non-volatile memory of the communication apparatus, and executes application software according to the state information. Therefore, for example, even in a case where the communication apparatus is in a sleep state, the portable terminal can recognize a state before the communication apparatus enters the sleep state, and activate the application software according to the state.

(11) A server according to another aspect of the present invention is a server configured to be communicable with a portable terminal, and to transmit a program to the portable terminal, wherein the program is the program for implementing the function of the portable terminal described above.

According to this configuration, the user can easily acquire the program for implementing the function of the portable terminal.

INDUSTRIAL APPLICABILITY

According to the present invention, it is possible to provide a user with various services simply by holding a portable terminal up over a communication apparatus a small number of times to activate a communication apparatus. Therefore, it is possible to provide a useful technology in providing the user with apparatus linkage services of operating a household electrical appliance configuring the communication apparatus, by using the portable terminal.

The invention claimed is:

1. A communication apparatus configured to be communicable with a portable terminal, the communication apparatus comprising:
   a proximity wireless power supply unit that is activated by radio waves of proximity wireless communication transmitted from the portable terminal;
   a non-volatile memory that is driven by power supplied from the proximity wireless power supply unit, and stores an operation command of the communication apparatus;

a proximity wireless communication unit that is driven by the power supplied from the proximity wireless power supply unit, and performs proximity wireless communication with the portable terminal;
a main power supply unit that is activated on the basis of a signal received by the proximity wireless communication unit; and
a control unit that is driven by power supplied from the main power supply unit, and reads out the operation command from the non-volatile memory to execute the operation command, wherein
the proximity wireless communication unit writes the operation command transmitted from the portable terminal, in the non-volatile memory, before the communication apparatus is activated, and
the control unit activates the main power supply unit to start activation of the communication apparatus after the writing of the operation command in the non-volatile memory is finished, and reads out the operation command from the non-volatile memory to execute the operation command after the activation of the communication apparatus is completed.

2. The communication apparatus according to claim 1, further comprising
a high-speed wireless communication unit that communicates with the portable terminal by using high-speed wireless communication with higher speed than the proximity wireless communication, wherein
the high-speed wireless communication unit is operable in a communication mode of either a master unit mode in which the communication apparatus accepts connection from the portable terminal that serves as a slave unit, or a slave unit mode in which the communication apparatus is connected to the portable terminal that serves as a master unit, and
the control unit determines, on the basis of the operation command written in the non-volatile memory, whether the high-speed wireless communication unit is operated in the master unit mode or in the slave unit mode.

3. The communication apparatus according to claim 2, wherein
the control unit previously writes, in the non-volatile memory, a first connection destination identifier used in a case where the communication apparatus is operated in the master unit mode.

4. The communication apparatus according to claim 2, wherein
in a case where the portable terminal is not connected to a repeater of the high-speed wireless communication, the proximity wireless communication unit receives an operation command including communication mode information indicating the master unit mode from the portable terminal, and writes the operation command in the non-volatile memory, while in a case where the portable terminal is connected to the repeater, the proximity wireless communication unit receives an operation command including communication mode information indicating the slave unit mode from the portable terminal, and writes the operation command in the non-volatile memory, and
the control unit causes the high-speed wireless communication unit to operate in the master unit mode in a case where the communication mode information indicates the master unit mode, while the control unit causes the high-speed wireless communication unit to operate in the slave unit mode in a case where the communication mode information indicates the slave unit mode.

5. The communication apparatus according to claim 2, wherein
in a case where the portable terminal is connected to a repeater of the high-speed wireless communication, the proximity wireless communication unit receives a second connection destination identifier whose connection destination is the repeater, from the portable terminal, and writes the second connection destination identifier as the operation command in the non-volatile memory, and
the control unit causes the high-speed wireless communication unit to operate in the master unit mode in a case where the second connection destination identifier is not written in the non-volatile memory, while the control unit causes the high-speed wireless communication unit to operate in the slave unit mode in a case where the second connection destination identifier is written in the non-volatile memory.

6. The communication apparatus according to claim 2, wherein
the control unit reads out the operation command from the non-volatile memory and switches the communication mode of the high-speed wireless communication unit, after the main power supply unit is activated.

7. A communication system comprising:
a portable terminal; and
a communication apparatus configured to be communicable with the portable terminal, wherein
the communication apparatus includes:
a proximity wireless power supply unit that is activated by radio waves of proximity wireless communication transmitted from the portable terminal;
a non-volatile memory that is driven by power supplied from the proximity wireless power supply unit, and stores an operation command of the communication apparatus;
a proximity wireless communication unit that is driven by the power supplied from the proximity wireless power supply unit, and performs proximity wireless communication with the portable terminal;
a main power supply unit that is activated on the basis of a signal received by the proximity wireless communication unit; and
a control unit that is driven by power supplied from the main power supply unit, and reads out the operation command from the non-volatile memory to execute the operation command,
the proximity wireless communication unit writes the operation command transmitted from the portable terminal, in the non-volatile memory, before the communication apparatus is activated, and
the control unit activates the main power supply unit to start activation of the communication apparatus after the writing of the operation command in the non-volatile memory is finished, and reads out the operation command from the non-volatile memory to execute the operation command after the activation of the communication apparatus is completed.

8. A portable terminal configured to be communicable with a communication apparatus, the portable terminal comprising:
a first proximity wireless communication unit that performs proximity wireless communication with the communication apparatus;

a high-speed wireless communication unit that performs high-speed wireless communication with higher speed than the proximity wireless communication; and a first control unit that transmits an operation command indicating a slave unit mode in which the communication apparatus is connected to the portable terminal that serves as a master unit, to the communication apparatus via the first proximity wireless communication unit, and writes the operation command in a non-volatile memory provided in the communication apparatus, in a case where the portable terminal is connected to a repeater of the high-speed wireless communication, wherein the communication apparatus includes:

a proximity wireless power supply unit that is activated by radio waves of proximity wireless communication transmitted from the portable terminal;

a second proximity wireless communication unit that is driven by the power supplied from the proximity wireless power supply unit, and performs proximity wireless communication with the portable terminal;

a main power supply unit that is activated on the basis of a signal received by the second proximity wireless communication unit and a second control unit that is driven by power supplied from the main power supply unit, and reads out the operation command from the non-volatile memory to execute the operation command, the second proximity wireless communication unit writes the operation command and the connection destination identified transmitted from the portable terminal, in the non-volatile memory, before the communication apparatus is activated, and the second control unit activates the main power supply unit to start activation of the communication apparatus after the writing of the operation command in the non-volatile memory is finished, and reads out the operation command from the non-volatile memory to execute the operation command after the activation of the communication apparatus is completed.

9. A non-transitory computer-readable recording medium which stores a program that causes a computer to function as a portable terminal configured to be communicable with a communication apparatus, the program causing the computer to function as:

a first proximity wireless communication unit that performs proximity wireless communication with the communication apparatus;

a high-speed wireless communication unit that performs high-speed wireless communication with higher speed than the proximity wireless communication; and a first control unit that, in a case where the portable terminal is connected to a repeater of the high-speed wireless communication, transmits an operation command indicating a slave unit mode in which the communication apparatus is connected to the portable terminal that serves as a master unit, and a connection destination identifier whose connection destination is the repeater, to the communication apparatus via the first proximity wireless communication unit, and the operation command and the connection destination identifier in a non-volatile memory provided in the communication apparatus, wherein the communication apparatus includes:

a proximity wireless power supply unit that is activated by radio waves of proximity wireless communication transmitted from the portable terminal;

a second proximity wireless communication unit that is driven by the power supplied from the proximity wireless power supply unit, and performs proximity wireless communication with the portable terminal;

a main power supply unit that is activated on the basis of a signal received by the second proximity wireless communication unit and a second control unit that is driven by power supplied from the main power supply unit, and reads out the operation command from the non-volatile memory to execute the operation command, the second proximity wireless communication unit writes the operation command and the connection destination identified transmitted from the portable terminal, in the non-volatile memory, before the communication apparatus is activated, and the second control unit activates the main power supply unit to start activation of the communication apparatus after the writing of the operation command in the non-volatile memory is finished, and reads out the operation command from the non-volatile memory to execute the operation command after the activation of the communication apparatus is completed.

10. A server configured to be communicable with a portable terminal, and to transmit a program to the portable terminal, wherein the program is the program according to claim 9.

* * * * *